(12) United States Patent
Saunders et al.

(10) Patent No.: US 10,097,844 B2
(45) Date of Patent: Oct. 9, 2018

(54) DATA ENCODING AND DECODING

(71) Applicant: Sony Corporation, Tokyo (JP)

(72) Inventors: Nicholas Ian Saunders, Basingstoke (GB); Karl James Sharman, East Ilsley (GB)

(73) Assignee: Sony Corporation, Tokyo (JP)

( * ) Notice: Subject to any disclaimer, the term of this patent is extended or adjusted under 35 U.S.C. 154(b) by 200 days.

(21) Appl. No.: 14/987,985

(22) Filed: Jan. 5, 2016

(65) Prior Publication Data

US 2016/0219289 A1 Jul. 28, 2016

(30) Foreign Application Priority Data

Jan. 23, 2015 (GB) .................................. 1501158.8

(51) Int. Cl.
*H04N 11/02* (2006.01)
*H04N 19/30* (2014.01)
*H04N 19/33* (2014.01)

(52) U.S. Cl.
CPC ........... *H04N 19/395* (2014.11); *H04N 19/33* (2014.11)

(58) Field of Classification Search
USPC ........................................ 375/240.01–240.29
See application file for complete search history.

(56) References Cited

U.S. PATENT DOCUMENTS

| 5,883,671 | A * | 3/1999 | Keng | ..................... H04N 19/00 348/448 |
| 6,173,408 | B1 * | 1/2001 | Jimbo | ....................... G06F 1/10 712/32 |
| 9,104,935 | B1 * | 8/2015 | Negro | ................... G06K 7/1465 |
| 2001/0038649 | A1 * | 11/2001 | Hagai | .............. H04N 21/23424 370/536 |
| 2003/0072375 | A1 | 4/2003 | Soundararajan | |
| 2004/0258162 | A1 * | 12/2004 | Gordon | .................. H04N 19/91 375/240.25 |

(Continued)

FOREIGN PATENT DOCUMENTS

EP 1 638 337 A1 3/2006

OTHER PUBLICATIONS

U.S. Appl. No. 14/394,834, filed Oct. 16, 2014, 2015/0063460A1, James A. Gamei et al.

(Continued)

*Primary Examiner* — Leron Beck
(74) *Attorney, Agent, or Firm* — Oblon, McClelland, Maier & Neustadt, L.L.P.

(57) ABSTRACT

A video data decoding apparatus configured to decode input encoded data representing a plurality of independently decodable portions of a video image, each portion representing a spatially subsampled version of the video image so that a combination of the plurality of portions provides a representation of all of the pixels of that video image, the video data decoding apparatus: one or more decoders having a collective processing capacity which is lower than the maximum possible processing requirements for decoding the plurality of portions; a controller configured to route data of the portions to the one or more decoders so that the one or more decoders cooperate to decode the whole of at least one of the portions for that video image; and a combiner configured to combine the decoded portions to generate a representation of that video image.

20 Claims, 13 Drawing Sheets

(56) References Cited

U.S. PATENT DOCUMENTS

| | | | |
|---|---|---|---|
| 2005/0036400 A1* | 2/2005 | Chen | G11C 7/1039 365/233.1 |
| 2006/0020870 A1* | 1/2006 | Hocevar | H03M 13/1117 714/752 |
| 2007/0016413 A1* | 1/2007 | Seo | H04L 1/0041 704/229 |
| 2008/0063082 A1* | 3/2008 | Watanabe | H04N 19/91 375/240.23 |
| 2008/0313484 A1* | 12/2008 | Ratakonda | G06F 9/5066 713/375 |
| 2010/0128801 A1* | 5/2010 | Hashimoto | H04N 19/00933 375/240.25 |
| 2010/0254620 A1* | 10/2010 | Iwahashi | H04N 19/70 382/233 |
| 2010/0303369 A1* | 12/2010 | Tomonaga | H04N 19/17 382/233 |
| 2012/0082240 A1* | 4/2012 | Takada | H04N 19/176 375/240.24 |
| 2012/0236939 A1 | 9/2012 | Filippini et al. | |
| 2013/0022114 A1 | 1/2013 | Lee et al. | |
| 2013/0114735 A1* | 5/2013 | Wang | H04N 19/176 375/240.23 |

OTHER PUBLICATIONS

U.S. Appl. No. 14/396,127, filed Oct. 22, 2014, 2015/0078447A1, James A. Gamei et al.
U.S. Appl. No. 14/523,637, filed Oct. 24, 2014, 2015/0043641A1, James A. Gamei et al.
U.S. Appl. No. 14/523,675, filed Oct. 24, 2014, 2015/0063457A1, James A. Gamei et al.
U.S. Appl. No. 14/396,983, filed Oct. 24, 2014, 2015/0117527A1, James A. Gamei et al.
U.S. Appl. No. 14/396,190, filed Oct. 22, 2014, 2015/0085924A1, James A. Gamei et al.
U.S. Appl. No. 14/396,979, filed Oct. 24, 2014, 2015/0172652A1, James A. Gamei et al.
U.S. Appl. No. 14/779,502, filed Sep. 23, 2015, David Berry et al.
U.S. Appl. No. 14/778,445, filed Sep. 18, 2015, David Berry et al.
August Mayer et al. "A Survey of Adaptive Layered Video Multicast using MPEG-2 Streams", 14st IST Mobile & Wireless Communications Summit, 5 pages.
Michael Gallant et al. "Standard-Compliant Multiple Description Video Coding", Proceedings 2001 International Conference on Image Processing, 4 pages.
Marco Folli et al. "Scalable multiple description coding of video sequences", GTTI, 2008, 7 pages.

\* cited by examiner

|  1200 |  |  |
| --- | --- | --- |
| A1 | A1 | A1 |
| B1 | B1 | B1* |
| C1 | C1 | C1 |
| D1 | D1 | D1 |

|  1210 |  |  |
| --- | --- | --- |
| A1 | A1 | A2* |
| B2 | B2 | B2 |
| C2 | C2 | C2 |
| D2 | D2 | D2 |

|  1220 |  |  |
| --- | --- | --- |
| A3 | A3 | A3 |
| B2 | B2 | B3 |
| C3 | C3 | C3 |
| D3 | D3 | D3 |

FIG. 26

| A1 | A1 | A1 |
| --- | --- | --- |
| B1 | B1 | B1 |
| C1 | A2 | A2 |
| D1 | D1 | D1 |

| A1 | A1 | D2 |
| --- | --- | --- |
| B2 | B2 | B2 |
| A2 | A2 | A2 |
| C2 | C2 | C2 |

FIG. 27

| A1 | A1 | A1 |
| --- | --- | --- |
| B1 | B1 | B1 |
| C1 | C1 | C1 |
| D1 | D1 | D1 |

| A1 | A1 | A2 |
| --- | --- | --- |
| B1 | B1 | B2 |
| C1 | C1 | C2 |
| D1 | D1 | D2 |

| A2 | A2 | A2 |
| --- | --- | --- |
| B2 | B2 | B2 |
| C2 | C2 | C2 |
| D2 | D2 | D2 |

| A2 |
| --- |
| B2 |
| C2 |
| D2 |

FIG. 28

DATA ENCODING AND DECODING

CROSS REFERENCE TO RELATED APPLICATIONS

The present application claims priority to United Kingdom Application 1501158.8 filed on 23 Jan. 2015, the contents of which being incorporated herein by reference in its entirety.

FIELD OF THE DISCLOSURE

This disclosure relates to data encoding and decoding.

DESCRIPTION OF THE RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

There are several video data compression and decompression systems which involve transforming video data into a frequency domain representation, quantising the frequency domain coefficients and then applying some form of entropy encoding to the quantised coefficients.

The transformation into the spatial frequency domain at the encoder side corresponds to an inverse transformation at the decoder side. Example transformations include the so-called discrete cosine transformation (DCT) and the so-called discrete sine transformation (DST). In some examples the transformations are carried out by matrix-multiplying an array of input samples (derived from the video data to be coded) by a matrix of transformation coefficients to generate frequency-transformed data. Frequency-transformed data is converted back to sample data, from which output video data can be derived, by matrix-multiplying an array of the frequency-transformed data by a matrix of inverse-transformation coefficients.

Some standards and draft standards, such as the so-called High Efficiency Video Coding (HEVC) standards, define encoding and decoding modes in which a spatial frequency transformation is not in fact used. These are sometimes referred to as "transform-skip" or "trans-quant skip" ("trans-quant" being an abbreviation for "transformation and quantisation") modes.

SUMMARY

An aspect of this disclosure is defined by claim 1.

Further respective aspects and features are defined in the appended claims.

It is to be understood that both the foregoing general description and the following detailed description are exemplary, but not restrictive of, the present disclosure.

BRIEF DESCRIPTION OF THE DRAWINGS

A more complete appreciation of the disclosure and many of the attendant advantages thereof will be readily obtained as the same becomes better understood by reference to the following detailed description of embodiments, when considered in connection with the accompanying drawings, wherein:

FIGS. 23 to 28 provide schematic examples of a best efforts decoding process.

DESCRIPTION OF THE EMBODIMENTS

Figure 1:
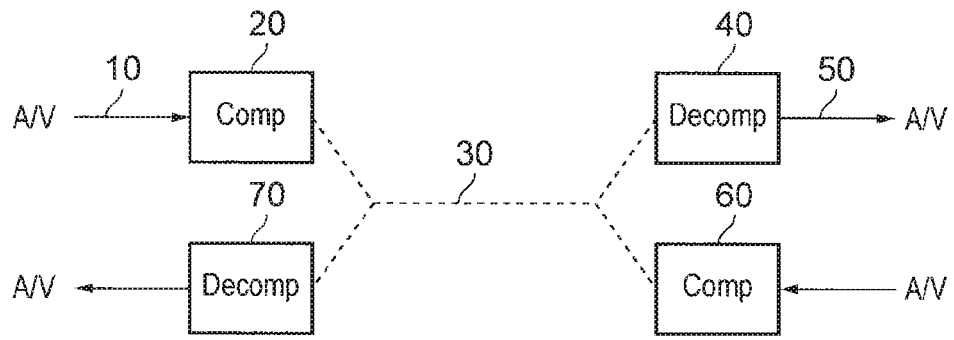
FIG. 1 schematically illustrates an audio/video (A/V) data transmission and reception system using video data compression and decompression.

Referring now to the drawings, FIGS. 1-4e are provided to give schematic illustrations of apparatus or systems making use of the compression and/or decompression apparatus to be described below in connection with embodiments.

All of the data compression and/or decompression apparatus is to be described below may be implemented in hardware, in software running on a general-purpose data processing apparatus such as a general-purpose computer, as programmable hardware such as an application specific integrated circuit (ASIC) or field programmable gate array (FPGA) or as combinations of these. In cases where the embodiments are implemented by software and/or firmware, it will be appreciated that such software and/or firmware, and non-transitory machine-readable data storage media by which such software and/or firmware are stored or otherwise provided, are considered as embodiments.

FIG. 1 schematically illustrates an audio/video data transmission and reception system using video data compression and decompression.

An input audio/video signal 10 is supplied to a video data compression apparatus 20 which compresses at least the video component of the audio/video signal 10 for transmission along a transmission route 30 such as a cable, an optical fibre, a wireless link or the like. The compressed signal is processed by a decompression apparatus 40 to provide an output audio/video signal 50. For the return path, a compression apparatus 60 compresses an audio/video signal for transmission along the transmission route 30 to a decompression apparatus 70.

The compression apparatus 20 and decompression apparatus 70 can therefore form one node of a transmission link. The decompression apparatus 40 and decompression apparatus 80 can form another node of the transmission link. Of course, in instances where the transmission link is uni-directional, only one of the nodes would require a compression apparatus and the other node would only require a decompression apparatus.

Figure 2:
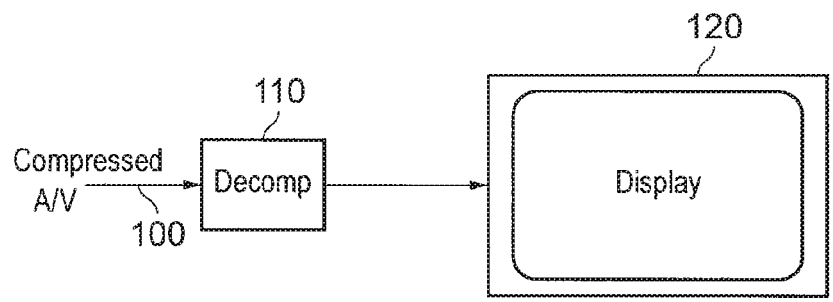
FIG. 2 schematically illustrates a video display system using video data decompression.

FIG. 2 schematically illustrates a video display system using video data decompression. In particular, a compressed audio/video signal 100 is processed by a decompression apparatus 110 to provide a decompressed signal which can be displayed on a display 120. The decompression apparatus 110 could be implemented as an integral part of the display 120, for example being provided within the same casing as the display device. Alternatively, the decompression apparatus 110 might be provided as (for example) a so-called set top box (STB), noting that the expression "set-top" does not imply a requirement for the box to be sited in any particular orientation or position with respect to the display 120; it is simply a term used in the art to indicate a device which is connectable to a display as a peripheral device.

Figure 3:
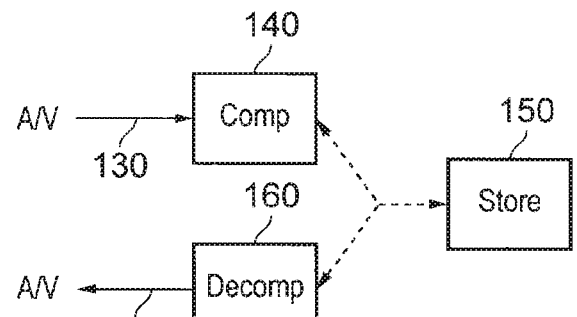
FIG. 3 schematically illustrates an audio/video storage system using video data compression and decompression.

FIG. 3 schematically illustrates an audio/video storage system using video data compression and decompression. An input audio/video signal 130 is supplied to a compression apparatus 140 which generates a compressed signal for storing by a store device 150 such as a magnetic disk device, an optical disk device, a magnetic tape device, a solid state storage device such as a semiconductor memory or other storage device. For replay, compressed data is read from the store device 150 and passed to a decompression apparatus 160 for decompression to provide an output audio/video signal 170.

If will be appreciated that the compressed or encoded signal, and a storage medium or data carrier storing that signal, are considered as embodiments. Reference is made to FIGS. 4d and 4e described below.

Figure 4A:
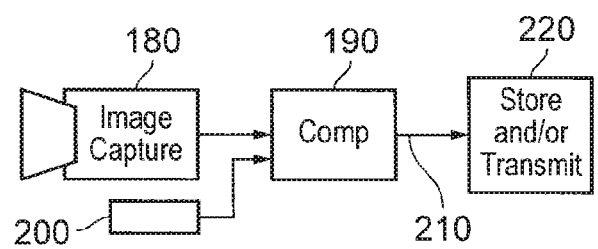
FIG. 4a schematically illustrates a video camera using video data compression.

FIG. 4a schematically illustrates a video camera using video data compression. In FIG. 4a, and image capture device 180, such as a charge coupled device (CCD) image sensor and associated control and read-out electronics, generates a video signal which is passed to a compression apparatus 190. A microphone (or plural microphones) 200 generates an audio signal to be passed to the compression apparatus 190, The compression apparatus 190 generates a compressed audio/video signal 210 to be stored and/or transmitted (shown generically as a schematic stage 220).

The techniques to be described below relate primarily to video data compression, it will be appreciated that many existing techniques may be used for audio data compression in conjunction with the video data compression techniques which will be described, to generate a compressed audio/video signal. Accordingly, a separate discussion of audio data compression will not be provided, it will also be appreciated that the data rate associated with video data, in particular broadcast quality video data, is generally very much higher than the data rate associated with audio data (whether compressed or uncompressed). It will therefore be appreciated that uncompressed audio data could accompany compressed video data to form a compressed audio/video signal. It will further be appreciated that although the present examples (shown in FIGS. 1-4e) relate to audio/video data, the techniques to be described below can find use in a system which simply deals with (that is to say, compresses, decompresses, stores, displays and/or transmits) video data. That is to say, the embodiments can apply to video data compression without necessarily having any associated audio data handling at all.

Figure 4B:
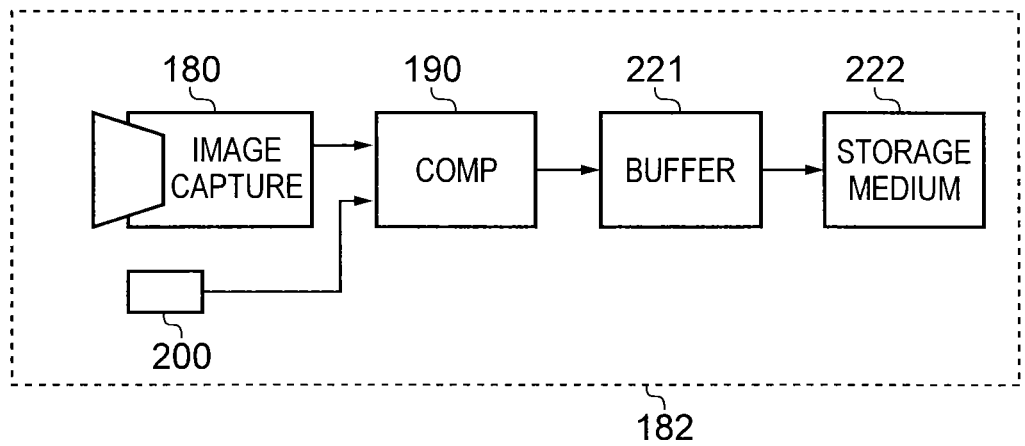
FIG. 4b schematically illustrates an example video camera in more detail.

FIG. 4b schematically illustrates an example video camera apparatus 183 in more detail. Those features numbered in common with FIG. 4a will not be described further. FIG. 4b is an example of the camera of FIG. 4a (in the case that the unit 220 of FIG. 4a provides a storage capability) in which the compressed data are first buffered by a buffer 221 and then stored in a storage medium 222 such as a magnetic disk, an optical disk, flash memory, a so-called solid-state disk drive (SSD) or the like. Note that the arrangement of FIG. 4b can be implemented as a single (physical) unit 182.

Figure 4C:
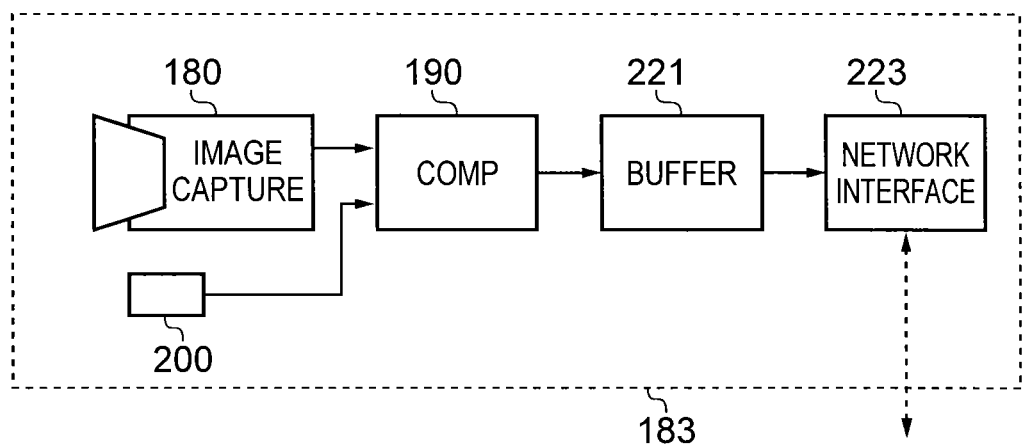
FIG. 4c schematically illustrates another example video camera.
Figure 4D:
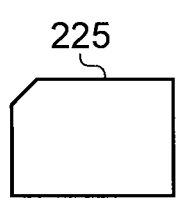
FIGS. 4d and 4e schematically illustrate data carriers.
Figure 4E:
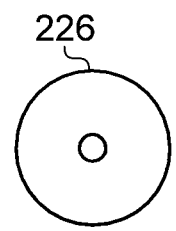

FIG. 4c schematically illustrates another example video camera in which, in place of the storage arrangement of FIG. 4b, a network interface 223 is provided in order to allow the compressed data to be transmitted to another unit (not shown). The network interface 223 can also allow for incoming data to be received by the video camera, such as control data. Note that the arrangement of FIG. 4b can be implemented as a single (physical) unit 183.

FIGS. 4d and 4e schematically illustrate data carriers, for example for use as the storage medium 222 and carrying compressed data which has been compressed according to the compression techniques described in the present application. FIG. 4d shows a schematic example of a removable non-volatile storage medium 225 implemented as solid state memory such as flash memory. FIG. 4e shows a schematic example of a removable non-volatile storage medium 228 implemented as a disk medium such as an optical disk.

Figure 5:
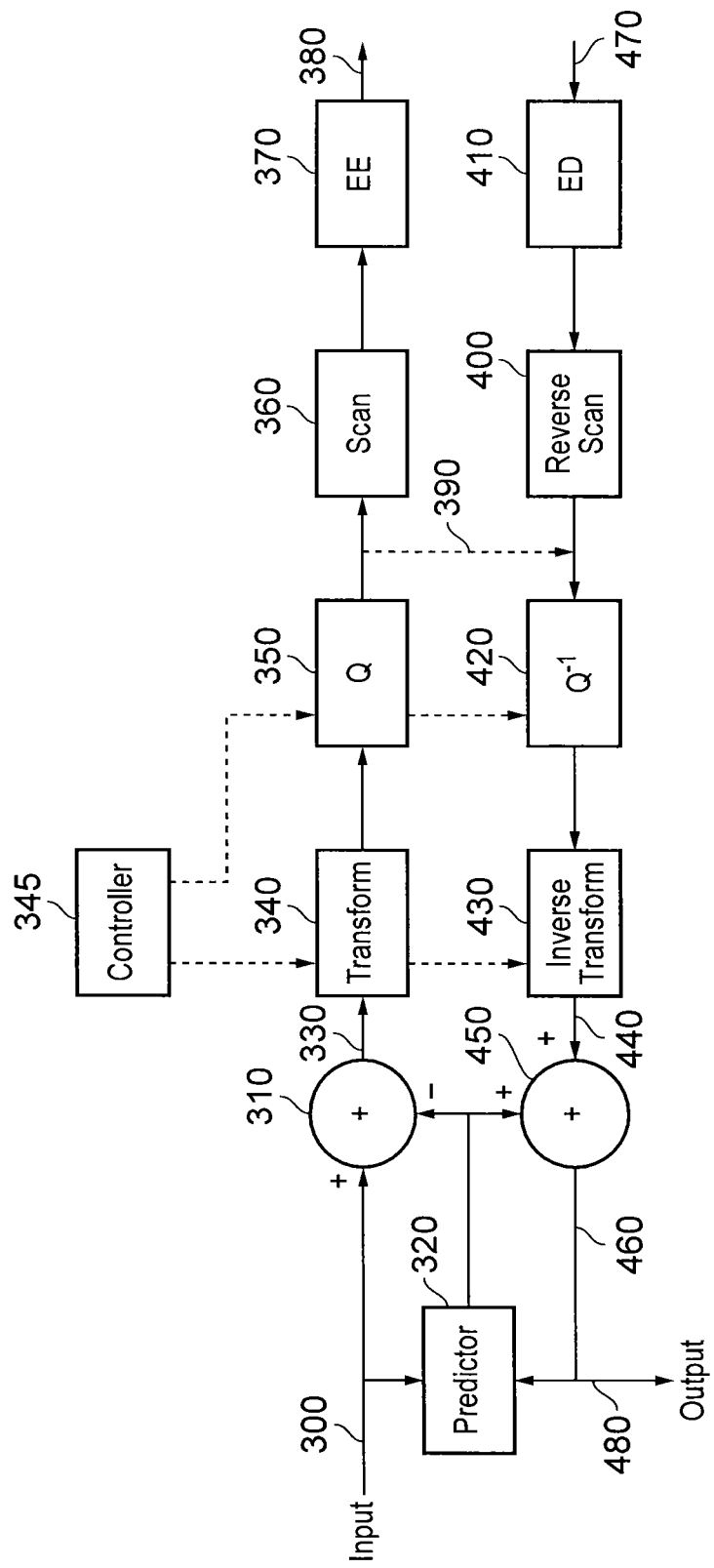
FIG. 5 provides a schematic overview of a video data compression and decompression apparatus.

FIG. 5 provides a schematic overview of a video data compression and decompression apparatus.

Successive images of an input video signal 300 are supplied to an adder 310 and to an image predictor 320. The image predictor 320 will be described below in more detail with reference to FIG. 6, The adder 310 in fact performs a subtraction (negative addition) operation, in that it receives the input video signal 300 on a "+" input and the output of the image predictor 320 on a "−" input, so that the predicted image is subtracted from the input image. The result is to generate a so-called residual image signal 330 representing the difference between the actual and projected images.

One reason why a residua! image signal is generated is as follows. The data coding techniques to be described, that is to say the techniques which will be applied to the residual image signal, tends to work more efficiently when there is less "energy" in the image to be encoded. Here, the term "efficiently" refers to the generation of a small amount of encoded data; for a particular image quality level, it is desirable (and considered "efficient") to generate as little data as is practicably possible. The reference to "energy" in the residual image relates to the amount of information contained in the residual image. If the predicted image were to be identical to the real image, the difference between the two (that is to say, the residual image) would contain zero information (zero energy) and would be very easy to encode into a small amount of encoded data. In general, if the prediction process can be made to work reasonably well, the expectation is that the residual image data will contain less information (less energy) than the input image and so will be easier to encode into a small amount of encoded data.

The residual image data 330 is supplied to a transform unit 340 which generates a discrete cosine transform (DCT) representation of the residual image data. The DCT technique itself is well known and will not be described in detail here. There are however aspects of the techniques used in the present apparatus which will be described in more detail below.

Note that in some embodiments, a discrete sine transform (DST) is used instead of a DCT, In other embodiments, no transform might be used. This can be done selectively, so that the transform stage is, in effect, bypassed, for example under the control of a "transform-skip" command or mode.

The output of the transform unit 340, which is to say, a set of transform coefficients for each transformed block of image data, is supplied to a quantiser 350. Various quantisation techniques are known in the field of video data compression, ranging from a simple multiplication by a quantisation scaling factor through to the application of complicated lookup tables under the control of a quantisation parameter. The general aim is twofold. Firstly, the quantisation process reduces the number of possible values of the transformed data. Secondly, the quantisation process can increase the likelihood that values of the transformed data are zero. Both of these can make the entropy encoding process work more efficiently in generating small amounts of compressed video data.

A controller 345 controls the operation of the transform unit 340 and the quantiser 350 (and their respective inverse units), according to techniques to be discussed further below. Note that the controller 345 may also control other aspects of the operation of the apparatus of FIG. 5.

A data scanning process is applied by a scan unit 360. The purpose of the scanning process is to reorder the quantised transformed data so as to gather as many as possible of the non-zero quantised transformed coefficients together, and of course therefore to gather as many as possible of the zero-valued coefficients together. These features can allow so-called run-length coding or similar techniques to be applied efficiently. So, the scanning process involves selecting coefficients from the quantised transformed data, and in particular from a block of coefficients corresponding to a block of image data which has been transformed and quantised, according to a "scanning order" so that (a) all of the coefficients are selected once as part of the scan, and (b) the scan tends to provide the desired reordering. One example scanning order which can fend to give useful results is a so-called zigzag scanning order.

The scanned coefficients are then passed to an entropy encoder (EE) 370. Again, various types of entropy encoding may be used. Two examples are variants of the so-called CABAC (Context Adaptive Binary Arithmetic Coding) system and variants of the so-called CAVLC (Context Adaptive Variable-Length Coding) system, in general terms, CABAC is considered to provide a better efficiency, and in some studies has been shown to provide a 10-20% reduction in the quantity of encoded output data for a comparable image quality compared to CAVLC. However, CAVLC is considered to represent a much lower level of complexity (in terms of its implementation) than CABAC.

Note that the scanning process and the entropy encoding process are shown as separate processes, but in fact can be combined or treated together. That is to say, the reading of data into (or processing of data by) the entropy encoder can take place in the scan order. Corresponding considerations apply to the respective inverse processes.

The output of the entropy encoder 370, along with additional data, for example defining the manner in which the predictor 320 generated the predicted image, provides a compressed output video signal 380.

However, a return path is also provided because the operation of the predictor 320 itself depends upon a decompressed version of the compressed output data.

The reason for this feature is as follows. At the appropriate stage in the decompression process a decompressed version of the residual data is generated. This decompressed residual data has to be added to a predicted image to generate an output image (because the original residual data was the difference between the input image and a predicted image), in order that this process is comparable, as between the compression side and the decompression side, the predicted images generated by the predictor 320 should be the same during the compression process and during the decompression process. Of course, at decompression, the apparatus does not have access to the original input images, but only to the decompressed images. Therefore, at compression, the predictor 320 bases its prediction (at least, for inter-image encoding) on decompressed versions of the compressed images.

The entropy encoding process carried out by the entropy encoder 370 is considered to be "lossless", which is to say that it can be reversed to arrive at exactly the same data which was first supplied to the entropy encoder 370. So, the return path can be implemented before the entropy encoding stage, indeed, the scanning process carried out by the scan unit 380 is also considered lossless, but in the present embodiment the return path 390 is from the output of the quantiser 350 to the input of a complimentary inverse quantiser 420.

In general terms, an entropy decoder 410, the reverse scan unit 400, an inverse quantiser 420 and an inverse transform unit 430 provide the respective inverse functions of the entropy encoder 370, the scan unit 360, the quantiser 350 and the transform unit 340. For now, the discussion will continue through the compression process; the process to decompress an input compressed video signal corresponds to the return path of the compression process and so a decoding apparatus or method corresponds to the features or operation of the decoding path of the encoder described here.

In the compression process, the scanned coefficients are passed by the return path 390 from the quantiser 350 to the inverse quantiser 420 which carries out the inverse operation of the scan unit 360. An inverse quantisation and inverse transformation process are carried out by the units 420, 430 to generate a compressed-decompressed residual image signal 440.

The image signal 440 is added, at an adder 450, to the output of the predictor 320 to generate a reconstructed output image 460. This forms one input to the image predictor 320.

Turning now to the process applied to a received compressed video signal 470, the signal is supplied to the entropy decoder 410 and from there to the chain of the reverse scan unit 400, the inverse quantiser 420 and the inverse transform unit 430 before being added to the output of the image predictor 320 by the adder 450. In straightforward terms, the output 460 of the adder 450 forms the output decompressed video signal 480. in practice, further filtering may be applied before the signal is output.

Accordingly, FIG. 5 provides an example of video data decoding apparatus operable to decode an array of encoded video data values, the apparatus comprising: a dequantiser configured to dequantise the array of encoded video data values by applying a dequantisation parameter to each data value so as to generate corresponding dequantised data values; and an inverse frequency transformer configured to apply an inverse frequency transform to the dequantised data values. FIG. 5 also provides an example of video data encoding apparatus operable to encode an array of input video data values in a transform-skip mode and optionally a non transform-skip mode (discussed further below), the apparatus comprising: a frequency transformer configured to apply a frequency transform to the input video data values to generate an array of frequency transformed input data values; and a quantiser configured to quantise the frequency transformed input data values by applying a quantisation parameter to each frequency transformed input data value so as to generate corresponding quantised data values. Note that the term "optionally" is used to indicate that the apparatus may be operable in a transform-skip mode and a non-transform-skip mode, with the selection being made on a block by block (such as TU-by-TU) or other basis, or may be an apparatus which is not operable in the non-transform-skip mode.

Figure 6:
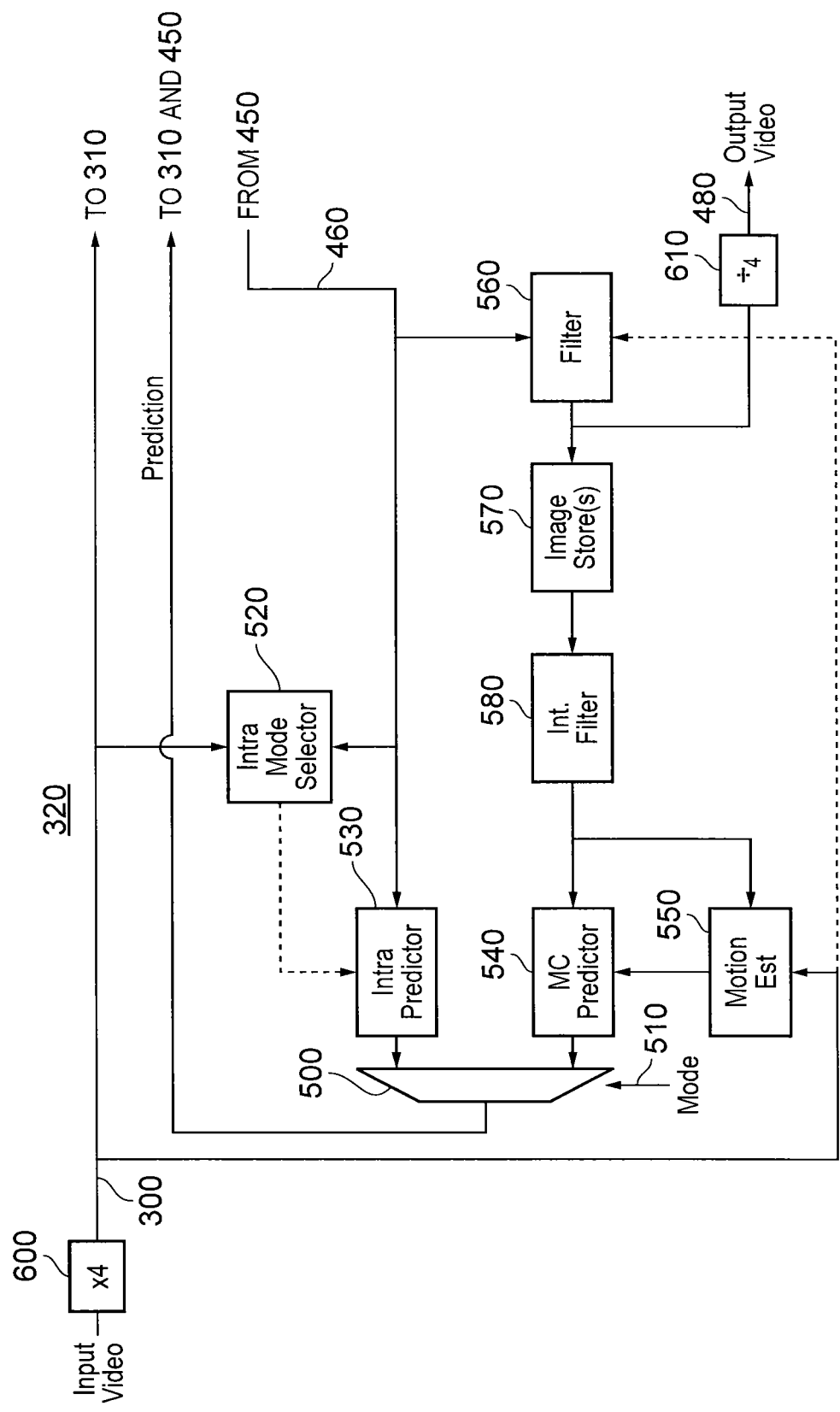
FIG. 6 schematically illustrates the generation of predicted images.

FIG. 6 schematically illustrates the generation of predicted images, and in particular the operation of the image predictor 320.

There are two basic modes of prediction: so-called intra-image prediction and so-called inter-image, or motion-compensated (MC), prediction.

Intra-image prediction bases a prediction of the content of a block of the image on data from within the same image. This corresponds to so-called I-frame encoding in other video compression techniques. In contrast to I-frame encoding, where the whole image is intra-encoded, in the present embodiments the choice between intra- and inter-encoding can be made on a block-by-block basis, though in other embodiments the choice is still made on an image-by-image basis.

Motion-compensated prediction makes use of motion information which attempts to define the source, in another adjacent or nearby image, of image detail to be encoded in the current image. Accordingly, in an ideal example, the contents of a block of image data in the predicted image can be encoded very simply as a reference (a motion vector) pointing to a corresponding block at the same or a slightly different position in an adjacent image.

Returning to FIG. 6, two image prediction arrangements (corresponding to infra- and inter-image prediction) are shown, the results of which are selected by a multiplexer 500 under the control of a mode signal 510 so as to provide blocks of the predicted image for supply to the adders 310 and 450. The choice is made in dependence upon which selection gives the lowest "energy" (which, as discussed above, may be considered as information content requiring encoding), and the choice is signalled to the encoder within the encoded output data stream, image energy, in this context, can be detected, for example, by carrying out a trial subtraction of an area of the two versions of the predicted image from the input image, squaring each pixel value of the difference image, summing the squared values, and identifying which of the two versions gives rise to the lower mean squared value of the difference image relating to that image area.

The actual prediction, in the intra-encoding system, is made on the basis of image blocks received as part of the signal 460, which is to say, the prediction is based upon encoded-decoded image blocks in order that exactly the same prediction can be made at a decompression apparatus. However, data can be derived from the input video signal 300 by an infra-mode selector 520 to control the operation of the intra-image predictor 530.

For inter-image prediction, a motion compensated (MC) predictor 540 uses motion information such as motion vectors derived by a motion estimator 550 from the input video signal 300. Those motion vectors are applied to a processed version of the reconstructed image 460 by the motion compensated predictor 540 to generate blocks of the inter-image prediction.

The processing applied to the signal 460 will now be described. Firstly, the signal is filtered by a filter unit 560. This involves applying a "deblocking" filter to remove or at least tend to reduce the effects of the block-based processing carried out by the transform unit 340 and subsequent operations. Also, an adaptive loop filter is applied using coefficients derived by processing the reconstructed signal 460 and the input video signal 300. The adaptive loop filter is a type of filter which, using known techniques, applies adaptive filter coefficients to the data to be filtered. That is to say, the filter coefficients can vary in dependence upon various factors. Data defining which filter coefficients to use is included as part of the encoded output data stream.

The filtered output from the filter unit 560 in fact forms the output video signal 480. it is also buffered in one or more image stores 570; the storage of successive images is a requirement of motion compensated prediction processing, and in particular the generation of motion vectors. To save on storage requirements, the stored images in the image stores 570 may be held in a compressed form and then decompressed for use in generating motion vectors. For this particular purpose, any known compression/decompression system may be used. The stored images are passed to an interpolation filter 580 which generates a higher resolution version of the stored images; in this example, intermediate samples (sub-samples) are generated such that the resolution of the interpolated image is output by the interpolation filter 580 is 8 times (in each dimension) that of the images stored in the image stores 570. The interpolated images are passed as an input to the motion estimator 550 and also to the motion compensated predictor 540.

In embodiments, a further optional stage is provided, which is to multiply the data values of the input video signal by a factor of four using a multiplier 600 (effectively just shifting the data values left by two bits), and to apply a corresponding divide operation (shift right by two bits) at the output of the apparatus using a divider or right-shifter 610. So, the shifting left and shifting right changes the data purely for the internal operation of the apparatus. This measure can provide for higher calculation accuracy within the apparatus, as the effect of any data rounding errors is reduced.

Figure 7:
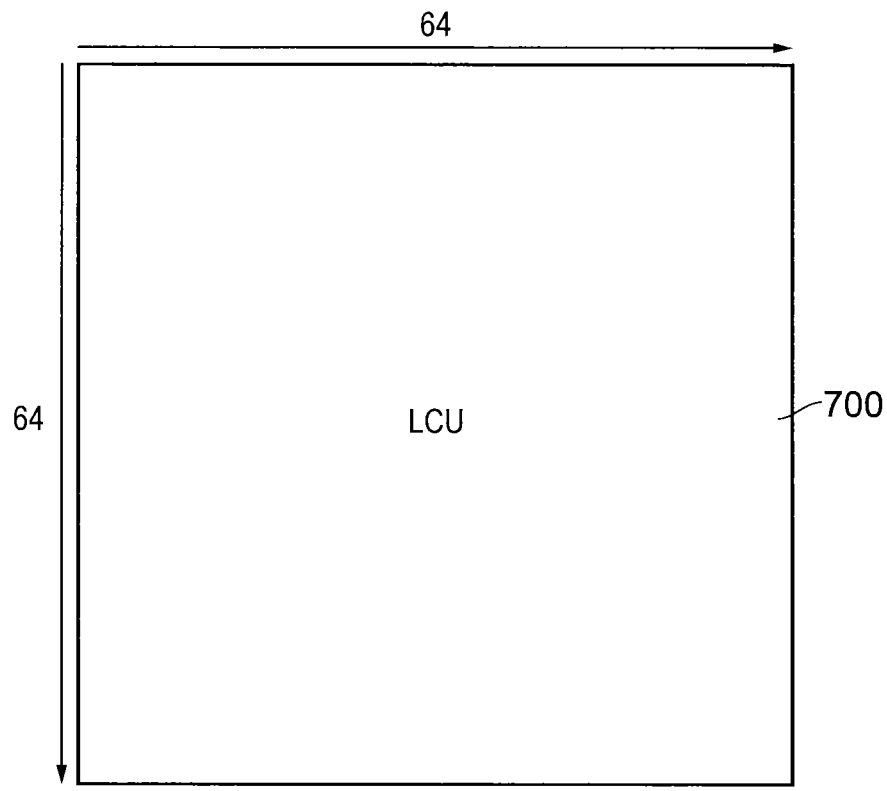
FIG. 7 schematically illustrates a largest coding unit (LCU)

The way in which an image is partitioned for compression processing will now be described. At a basic level, and image to be compressed is considered as an array of blocks of samples. For the purposes of the present discussion, the largest such block under consideration is a so-called largest coding unit (LCU) 700 (FIG. 7), which represents a square array of 64×64 samples. Here, the discussion relates to luminance samples. Depending on the chrominance mode, such as 4:4:4, 4:2:2, 4:2:0 or 4:4:4:4 (GBR plus key data), there will be differing numbers of corresponding chrominance samples corresponding to the luminance block.

Three basic types of blocks will be described: coding units, prediction units and transform units. In general terms, the recursive subdividing of the LCUs allows an input picture to be partitioned in such a way that both the block sizes and the block coding parameters (such as prediction or residual coding modes) can be set according to the specific characteristics of the image to be encoded.

Figure 8:
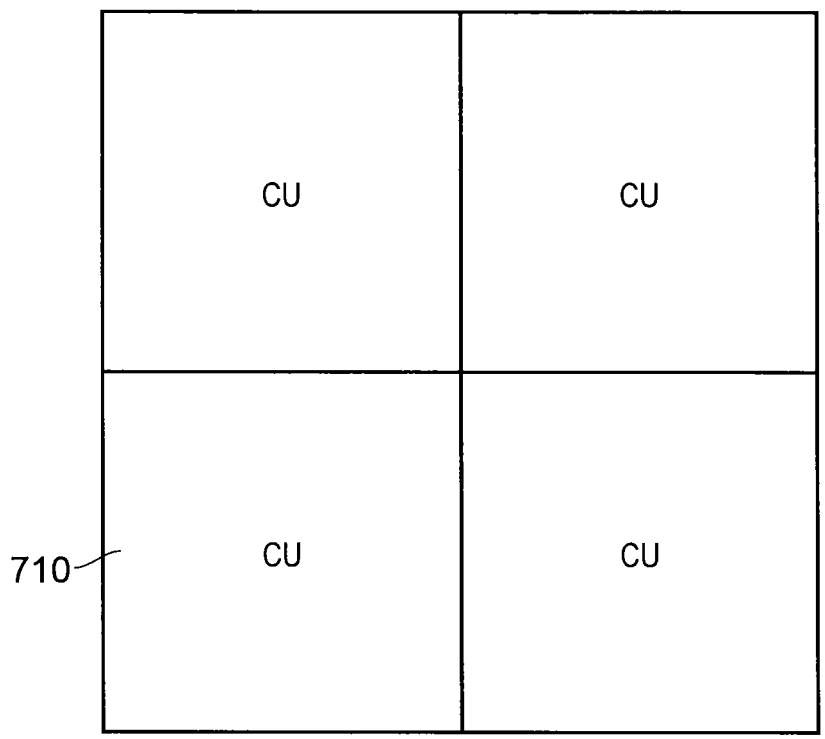
FIG. 8 schematically illustrates a set of four coding units (CU)
Figure 9:
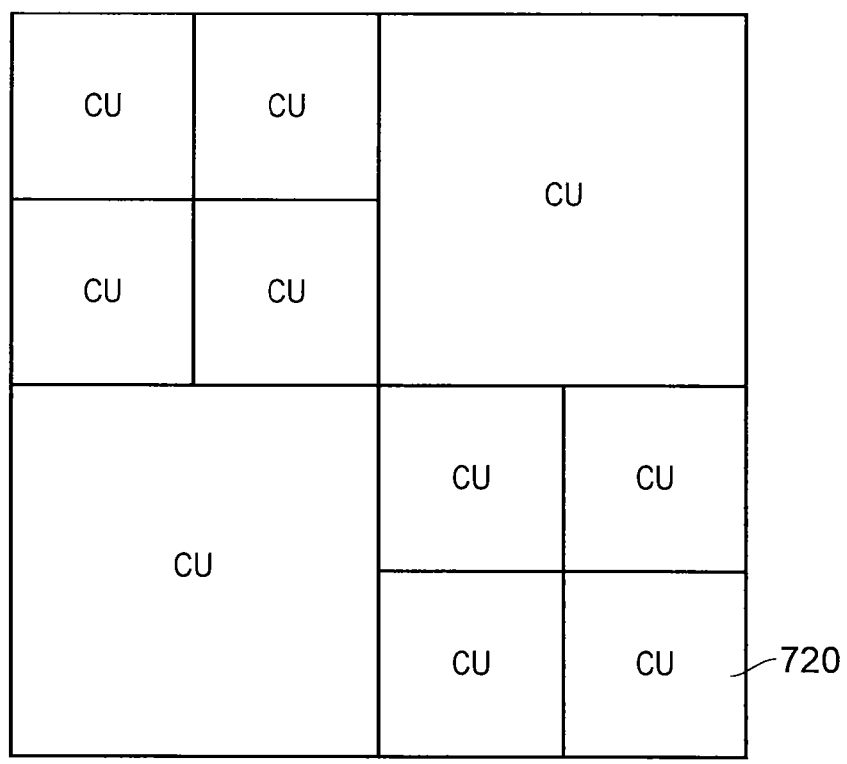
FIGS. 9 and 10 schematically illustrate the coding units of FIG. 8 sub-divided into smaller coding units.
Figure 10:
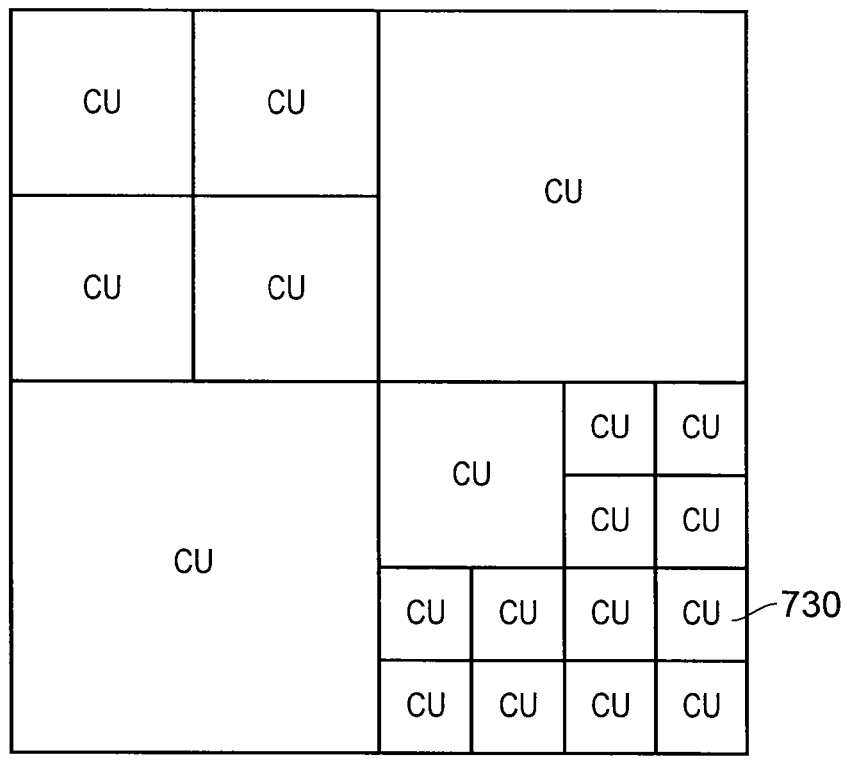

The LCU may be subdivided into so-called coding units (CU). Coding units are always square and have a size between 8×8 samples and the full size of the LCU 700, The coding units can be arranged as a kind of tree structure, so that a first subdivision may take place as shown in FIG. 8, giving coding units 710 of 32×32 samples; subsequent subdivisions may then take place on a selective basis so as to give some coding units 720 of 16×16 samples (FIG. 9) and potentially some coding units 730 of 8×8 samples (FIG. 10), Overall, this process can provide a content-adapting coding tree structure of CU blocks, each of which may be as large as the LCU or as small as 8×8 samples. Encoding of the output video data takes place on the basis of the coding unit structure.

Figure 11:
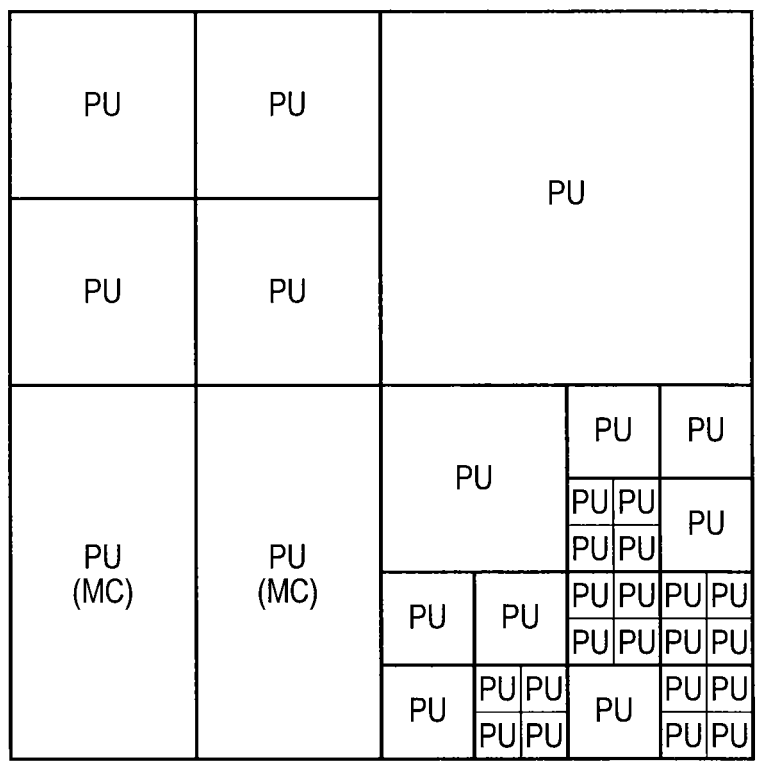
FIG. 11 schematically illustrates an array of prediction units (PU)

FIG. 11 schematically illustrates an array of prediction units (PU). A prediction unit is a basic unit for carrying information relating to the image prediction processes, or in other words the additional data added to the entropy encoded residual image data to form the output video signal from the apparatus of FIG. 5. In general, prediction units are not restricted to being square in shape. They can fake other shapes, in particular rectangular shapes forming half of one of the square coding units, as long as the coding unit is greater than the minimum (8×8) size. The aim is to allow the boundary of adjacent prediction units to match (as closely as possible) the boundary of real objects in the picture, so that different prediction parameters can be applied to different real objects. Each coding unit may contain one or more prediction units.

Figure 12:
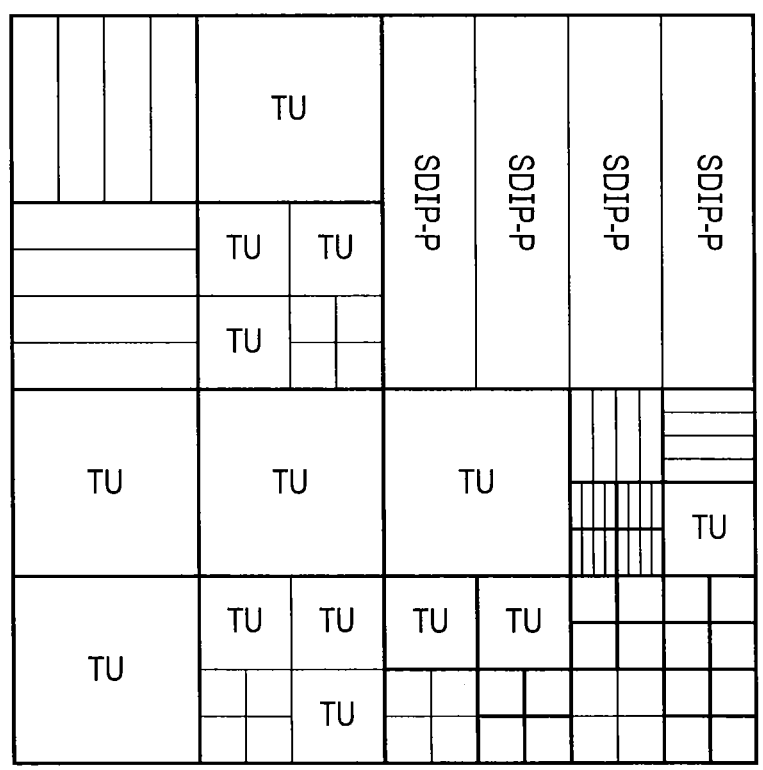
FIG. 12 schematically illustrates an array of transform units (TU)

FIG. 12 schematically illustrates an array of transform units (TU). A transform unit is a basic unit of the transform and quantisation process. Transform units are always square and can take a size from 4×4 up to 32×32 samples. Each coding unit can contain one or more transform units. The acronym SDIP-P in FIG. 12 signifies a so-called short distance intra-prediction partition. In this arrangement only one dimensional transforms are used, so a 4×N block is passed through N transforms with input data to the transforms being based upon the previously decoded neighbouring blocks and the previously decoded neighbouring lines within the current SDIP-P.

At least parts of the entropy encoding operations carried out by the entropy encoder 370 can make use of so-called CABAC (context adaptive binary arithmetic coding) techniques. The CABAC context modelling and encoding process is described in more detail in "Draft high efficiency video coding (HEVC) version 2, combined format range extensions (RExt), scalability (SHVC), and multi-view (MV-HEVC) extensions", JCTVC-R1013_v6, Draft ISO/IEC 23008-HEVC; 201×(E)2014-10-01.

A significant feature of the CABAC system is that a particular CABAC bitstream has to be decoded by a single decoder. That is to say, the CABAC data for a particular individual bitstream is inherently serialised, because each encoded value depends on previously encoded values, and cannot be handled by multiple decoders in parallel. However, when decoding video at very high operating points (for example, high bit rates and/or high quality such as professional quality), the CABAC throughput requirement is such that it becomes difficult to implement an entropy-decoder capable of decoding the worst-case frame in a timely manner. With this and other similar throughput constraints in mind, parallel operation of data-processing systems such as HEVC video decoders has been proposed.

Various issues arise when parallel decoder operation is being contemplated. As discussed above, a particular bitstream should be decoded by a respective decoder. Also, there is a need to divide the decoding tasks substantially evenly between multiple parallel decoders if the overall aim of decoding a whole frame in a single frame period is to be achieved. Techniques for addressing these requirements and, in some situations, allowing derogation from data formats defined by the HEVC standard for use in transmitting data from a transmitter (encoder) to a receiver (decoder), will now be described.

In the following description, techniques will be discussed for encoding an image or group of images as a set of portions. The number of portions and the nature of the division into portions can be varied, such that the examples given below in which four portions are used should merely be treated as examples for the purposes of the explanation here, in terms of the encoding process, the portions can be encoded separately (for example, by a parallel arrangement of multiple encoders), or by a single encoder operating separately on each portion, or by a combination of these techniques. Purely to illustrate some options within this range of techniques, FIG. 13 schematically illustrates an encoder arrangement using plural encoders and FIG. 14 schematically illustrates a time division encoder arrangement.

Figure 13:
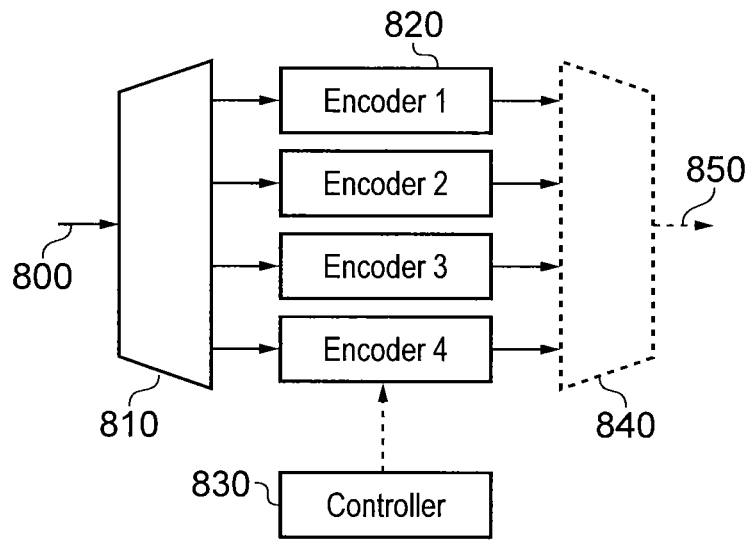
FIG. 13 schematically illustrates an encoder arrangement using plural encoders.

Referring to FIG. 13, an input video signal 800 is demultiplexed by a demultiplexer 810 into four separate portions, each of which is encoded by the respective encoder 820 (labelled on the drawing as encoder 1, 2, 3, 4) under the control of a controller 830. Optionally, a multiplexer 840 can be used to multiplex the four encoded signals into an output signal 850.

Figure 14:
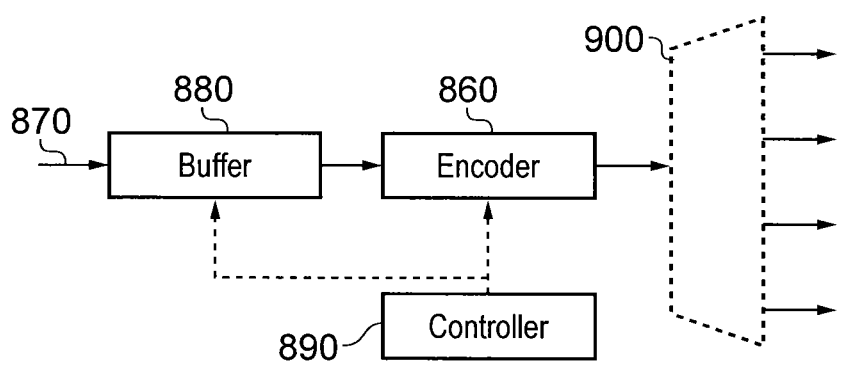
FIG. 14 schematically illustrates a time division encoder arrangement.

FIG. 14 schematically illustrates an arrangement employing a single encoder 860 operating in a time division manner. An input video signal 870 is (optionally) buffered by a buffer 880, and a controller 890 controls the reading of data from the buffer 880 and its encoding by the encoder 860. Optionally, a demultiplexer 900 can be used to demultiplexed the encoded data from the encoder 860 into multiple data streams, for example one for each portion.

In this way, bearing in mind the optional output components described in respect of each of FIGS. 13 and 14, a single output stream or multiple portion-specific output streams can be generated.

FIGS. 13 and 14 therefore provide examples of a video data encoding apparatus configured to encode input video data representing successive images of a video signal, the encoding apparatus comprising: a data partitioning unit configured to partition an image of the input video signal into a plurality of independently decodable portions, each portion representing a spatially subsampled version of the video image so that a combination of the plurality of portions provides a representation of ail of the pixels of that video image, and to associate indicator data with the plurality of independently decodable portions so as to indicate the partitioning to a decoder.

Figure 15:
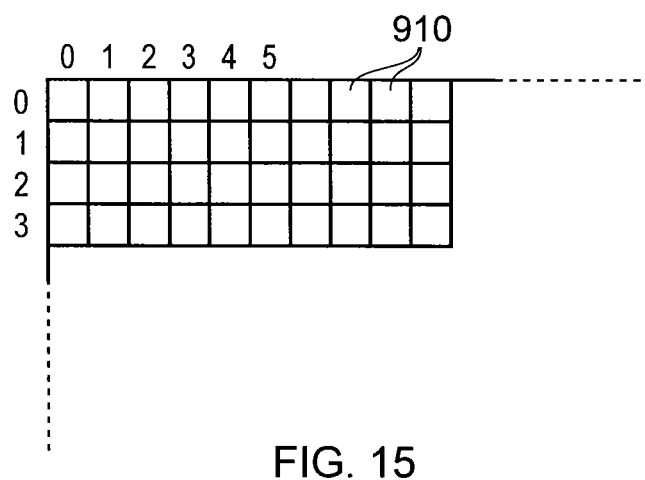
FIG. 15 schematically illustrates a pixel partitioning process.
Figure 16:
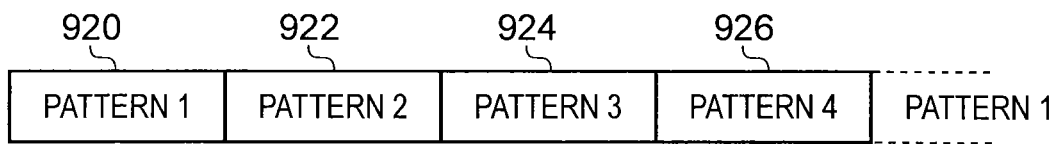
FIG. 16 schematically illustrates a sequence of partition patterns.

So far, the discussion of FIGS. 13 and 14 has related to the encoding of respective portions, but not to the nature of those portions themselves. To explain what is meant by the portions, reference is made to FIGS. 15 and 16. Two different types of division of a video signal into portions will be described. In the case of FIG. 15, the division is a spatial division such that a single image is divided into multiple portions. In the case of FIG. 16, a temporal variation will also be discussed.

In general, the encoder(s) can generate encoded data (for decoding by a decoding apparatus and method, to be described below) representing a plurality of independently decodable portions of a video image, each portion representing a spatially subsampled version of the video image so that a combination of the plurality of portions provides a representation of all of the pixels of that video image. The term "independently decodable" implies that a portion can be decoded without relying on the presence of data from another portion. This does not preclude further processing (such as a post-filtering operation) being applied across portion boundaries, but does mean that each portion can be recovered by a decoding process even if another portion is unavailable.

FIG. 15 schematically illustrates a pixel partitioning process. Pixels 910 are arranged, within an image, as an array of pixels such that each pixel can be considered to have a row-number and a column number within the array. The specific numbering scheme is arbitrary but an example will be discussed here. For example, the rows of pixels may be numbered starting at the top-left pixel and progressing downwards, as shown in FIG. 15. Similarly, columns of pixels may be numbered as shown in FIG. 15, starting from the top-left pixel and progressing rightwards. An example of the division into portions is then as follows. Each pixel is treated as an "even" row or an "odd" row, and as an "even" column or an "odd" column. Four substantially evenly sized portions are then derived as:

EE: pixels having an even row number and an even column number

EO: pixels having an even row number and an odd column number

OE: pixels having an odd row number and an even column number

OO: pixels having an odd row number and an odd column number

It will therefore be appreciated that any individual one of the four portions may be considered as a subsampled version of the full image, if, for the sake of discussion, only one of the portions could be decoded in respect of a particular image, the decoded output would still give a reasonable impression of the original image, just at a lower image quality corresponding to the subsampled nature of the portion. The portions as described above therefore provide an example of an arrangement in which each spatially subsampled version comprises every $n^{th}$ pixel of an image in a horizontal image direction and every $m^{th}$ pixel of that image in a vertical image direction, and an example of an arrangement in which the number of portions in the plurality of portions is equal to m×n. In the examples shown, a combination of all of the portions provides a representation of all of the pixels of the image under consideration. Each pixel in these examples is represented by only a respective one of the portions, and at least one portion (in fact, in these examples, all four portions) provides a subsampled representation of the entire video image.

It will be appreciated that fewer or more than four portions may be used in respect of a single image. For example, nine such portions could encompass permutations of every first, second or third pixel in a row direction and every first, second or third pixel in a column direction, in another example, six such portions could encompass permutations of every first, second or third pixel in a row direction and every first or second pixel in a column direction. Other similar examples are of course possible. More generally, each spatially subsampled version may (in example embodiments) comprise every $n^{th}$ pixel of an image in a horizontal image direction and every $m^{th}$ pixel of that image in a vertical image direction, in such a situation, the number of portions in the plurality of portions may be equal to m×n. However, the portions do not in fact have to be equally sized.

In the case of a system which uses temporal partitioning (to be discussed below) if can be useful that at least sub-groups of such portions have a substantially similar size in the original image.

In embodiments of the disclosure, the portions are transmitted from the encoder to the decoder in the form of a partitioned image, being an encoded representation of the same image size as the original image, although in other examples, images at a higher image rate but a smaller size could be sent as the portions, in examples, intra coding can be appropriate for such sub-images. In other words, each of the portions is encoded independently of the other portions (using the encoder of FIG. 13 or FIG. 14, for example), but then the encoded data representing the portions are reassembled into the format of a single image according to a pattern which will be referred to here as a "partition pattern". Examples of the partition pattern will be discussed further below, but first, with reference to FIG. 16, a possible time dependency of the partition pattern will be discussed.

At a basic level, the partition pattern can remain the same from image to image, so that the encoded data is subject just to a spatial partitioning, or it can vary from image to image so that the encoded data is also subject to a temporal partitioning.

FIG. 16 schematically illustrates a sequence of partition patterns in a temporal partitioning scenario. In FIG. 16, time is represented along a horizontal axis (for example, from left to right), and successive images 920, 922, 924, 926 . . . are subject to different respective partition patterns. As an example, four partition patterns (labelled as patterns 1 . . . 4) are used on a regular rolling sequence from image to image, so that after the four partition patterns have each been used once, the first of those four is used again and the pattern repeats. However, it will be appreciated that other embodiments may encompass a sequence of partition patterns in which any one or more of the following may apply:

more than or fewer than four partition patterns are used a partition pattern is repeated between two or more successive images the ordering of partition patterns (within a single instance of a set of the partition patterns within the overall sequence) varies between one such instance and another such a change in ordering is on a predetermined basis such as a cyclic pseudorandom basis such a change in ordering is selected and indicated by the encoder in respect of each such instance, an example of a change in ordering being in response to a scene change The partition pattern in use can be signalled from the encoder to the decoder in, for example a parameter set (such as a sequence parameter set) or other encoder-adjustable metadata associated with the encoded video data. Another example of a technique for communicating such a change is to use a supplemental enhancement information (SEI) message.

The discussion of FIG. 16 has dealt with the temporal variation, from image to image, of the partition patterns. FIGS. 17a to 17d concern examples of such partition patterns. In a spatial (only) partitioning, just one of the partition patterns of FIGS. 17a-d (such as the partition of FIG. 17a) would be used, and the partition pattern would be the same from image to image, in the case of a temporal partitioning, a set of patterns (such as the partition patterns 1 . . . 4 of FIG. 16) would (in this example) correspond to respective ones of the partition patterns of FIGS. 17a-d.

Accordingly, FIGS. 17a to 17d schematically illustrate example partition patterns in which the encoded data corresponding to each of the portions (such as EE, EO, OE, OO) into which the image was divided are transmitted to the decoder as though forming part of a single image, for example as respective tiles or slices of a single image, although (for example, if intra coding were used) the portions could be sent as respective, smaller, images such as four images each of one quarter-size in comparison to the original images, giving a frame rate (in respect of the one quarter sized images) four times higher than that of the original images. It can be seen that the partition patterns vary between FIGS. 17a-d, for example corresponding to the patterns 1 . . . 4 of FIG. 16. The potential relevance of this variation to the decoding process will be discussed below.

The use of tiles or slices provides an example of the portions in respect of an image being encoded as respective independently decodable regions of a composite image formed by juxtaposition of the portions. The portions may be arranged in the composite image according to a portion pattern, which may be the same or may vary between images of the video signal. In some examples the portion pattern varies between successive images.

In the case of FIGS. 17a to 17d, at the vertical boundary 932 between the portions, and at the horizontal boundary 934 between portions, there is an abrupt transition in image content compared to the situation that would have applied if the original single image were being encoded. This is because the top row of pixels relating to the lower two portions (the lower portions being OE and OO in FIG. 17a, for example) in fact contains image content from the very top of the original image. Similarly, the left hand column of pixels in the two right hand portions (the right hand portions being EO and OO in FIG. 17a, for example) contains image content relating to the left hand edge of the original single image. This abrupt transition does not affect the encoding efficiency, because the portions are handled separately as tiles and/or slices, but can affect the operation of any filtering processes which could span the boundaries 932, 934, such as a so-called deblocking filter.

This means that in the encoding and/or decoding of image portions in the form shown in any of FIGS. 17a to 17d, for example, where multiple subsampled image portions are abutted to form a composite image, it can be useful not to apply any filtering processes which could span the boundaries 932, 934, such as a so-called deblocking filter.

Figure 17A:
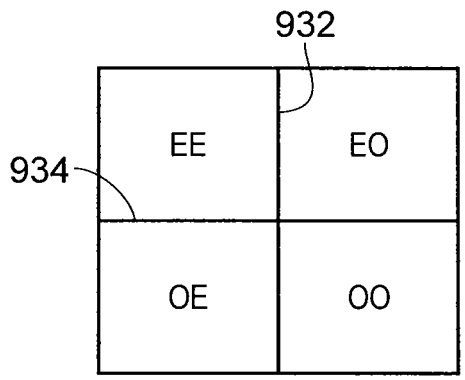
FIGS. 17a to 17f schematically illustrate partition patterns.
Figure 17B:
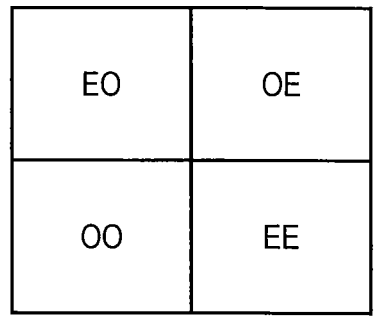
Figure 17C:
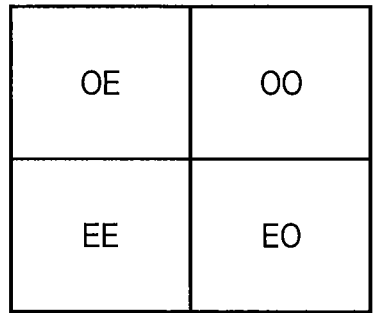
Figure 17D:
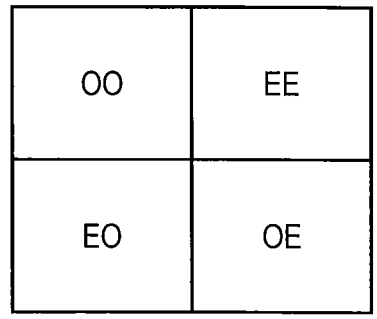
Figure 17E:
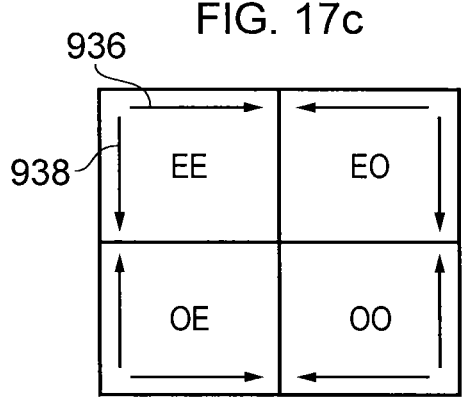
Figure 17F:
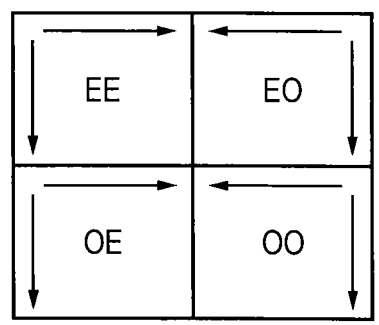

FIGS. 17e and 17f provide portion structures which can address or at least partially alleviate this issue, allowing filtering processes which span the boundaries between portions to be used. In such arrangements, in which the portion pattern is such that a pixel order is reversed in at least one of the portions.

In particular, in at least some portions, the ordering of pixels is reversed horizontally, vertically or both, so that at one or both of the horizontal and vertical boundaries between adjacent portions, the pixels either side of the boundary represent more similar image content than would be the case in the situations of FIGS. 17a to 17d. Purely for the purposes of the drawings, two arrows 936, 938 are shown in respect of each portion in FIGS. 17e and 17f; these do not form part of the image content themselves, but rather they represent an ordering of pixels in that portion. A horizontal arrow 936 extends from a top left corner (before any reordering) to a top right corner (before any reordering). Therefore, if the horizontal arrow 936 runs from left to right in any of the portions of FIGS. 17e and 17f, this indicates that an original left-to-right horizontal order is maintained. If the horizontal arrow 936 runs from right to left in any of the portions of FIGS. 17e and 17f, this indicates that a reversed left-to-right horizontal order has been applied. Similarly, a vertical arrow 938 extends from a top left corner (before any reordering) to a bottom left corner (before any reordering). Therefore, if the vertical arrow 938 runs downwards in any of the portions of FIGS. 17e and 17f, this indicates that an original vertical order is maintained. If the vertical arrow 938 extends vertically upwards in any of the portions of FIGS. 17e and 17f, this indicates that a reversed vertical pixel has been applied.

In the example of FIG. 17e, the upper right portion EO has been reversed horizontally but not vertically. The lower right portion OO has been reversed both horizontally and vertically. The lower left portion OE has been reversed vertically. FIG. 17e therefore provides an example in which pixel reordering has been applied to one or more portions so that the image content either side of horizontal and vertical boundaries is derived from adjacent or nearby regions of the original image. A filter spanning the boundaries, such as a deblocking filter, can therefore be used.

A separate issue, which may or may not be significant in respect of a particular system design, can arise in respect of the arrangement of FIG. 17e. This is that an additional delay is required at encoding and/or decoding, compared to the arrangement of FIG. 17a. The additional delay is imposed because the reordering means that pixels relating to a vertically central region of the image are not available until the bottom regions of the two lower portions. To address this, in other examples only a horizontal reordering is applied, as this makes zero difference or a trivial (half a line) difference in output timing at decoding, compared to the situation of FIG. 17a.

In the example of FIG. 17f, the two right hand portions (EO, OO in this example) have been reversed horizontally. No portions have been reversed vertically. This allows a filter spanning the vertical boundary 932 to be used, such as a deblocking filter.

Note that in the examples of FIGS. 17e and 17f, the upper left portion has not been reversed, and other portions have been reversed to suit the orientation of the upper left portion. Of course, it will be appreciated that it is the relative orientation of the portions which is significant in the discussion of FIGS. 17e and 17f. Therefore, in FIGS. 17e and 17f (for example) the upper left portion could be reversed horizontally and/or vertically, and other portions either reversed or not, to correspond to this orientation.

Note that all of the examples of FIGS. 17a to 17f have been provided in respect of four portions, but other portion arrangements and subsampling selections (whether with four portions or another number of portions) may be used. Similarly, in the arrangements of FIGS. 17e and 17f, a significant feature is reversing the pixel order in one or both directions so as to aim to reduce abrupt transitions in image content either side of a boundary between portions. Note that this does not require the use of exactly four portions, just a plurality of portions disposed adjacent one another in the general form discussed above.

Figure 18:
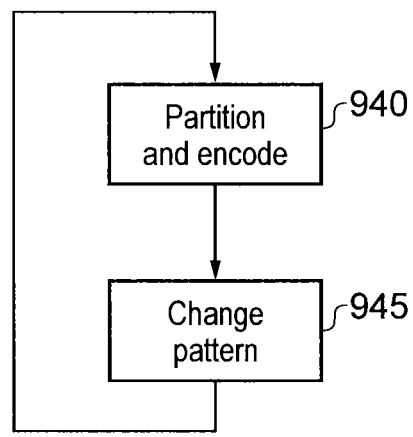
FIG. 18 is a schematic flowchart illustrating steps in a temporal partitioning process.

FIG. 18 is a schematic flowchart illustrating steps in a temporal partitioning process. These steps may be carried out by the encoder of FIGS. 13 or 14 (in each case, with using the encoding arrangements shown in detail in FIG. 5), and in particular by (or under the control of) the controller 830 or 890.

At a step 940, the encoder of FIG. 5 divides a current image to be encoded into plural portions, optionally reverses the pixel order of one or more portions as discussed above, and encodes each portion independently, for example as respective image tiles. At a step 945, the encoder changes the partitioning pattern to be applied to a next successive image.

Note that the encoder can signal the portion structure, the partitioning arrangement and/or a time variation of either of these to the decoder using a supplemental enhancement information (SEI) message associated with the image portions, the format of such a message can be established in advance as between encoders and decoders, so that a decoder receiving such a message can reconstruct the original image from the portions.

Note that in a spatial-only partitioning system, the flowchart is the same but omits the step 945.

The decoding of either a spatially or a temporally partitioned data stream will now be discussed with reference to FIG. 19, which schematically illustrates a decoder arrangement using plural decoders as an example of one or more (for example, a plurality of) parallel decoders having a collective processing capacity which is lower than the maximum possible processing requirements for decoding the plurality of portions.

Note that other uses of the present techniques are available. An example relates to fault tolerance, masking or concealment, such that if there is a transmission, recording, reception and/or replay error in the handling of the encoded data, the partitioning of the data means that other nearby pixels are more likely to be available, because spatially and/or temporally adjacent pixels are encoded at quite different locations in the encoded data. Another example relates to so-called proxy generation, in some instances, such as simultaneously previewing multiple instances of stored video, or deciding whether to stream a high definition video stream over a network or from an internet or cloud provider, the present techniques can provide an elegantly convenient way of allowing a preview or proxy version of the video to be decoded, at a lower resolution but sufficient to allow the user to decide whether to access the full resolution content, simply by decoding only a subset of the portions. In the case of partial decoding (that is, not all of the portions), this can be carried out (for example) for bandwidth reasons (so that a version of the video can be sent over a network link of a lower bandwidth or data rate than the rate which would be required to send the full resolution version), and/or for power saving reasons (to save power at the decoder, for example—something which can be relevant in particular in the case of portable devices), and/or for reasons of limited processing resources at the decoder (such as at a mobile device).

In some embodiments, streams of encoded video data may be constructed by circuitry such that packets representing one or more independently decodable portions are assembled into a first stream. The balance of the independently decodable portions needed to provide a representation of all of the pixels of the video image are assembled into a second stream or a hierarchy of second streams. The first stream may be transmitted over a network or communication channel with a higher priority or likelihood of reception than the second stream(s). The streams may be reassembled into one stream at a receiver/decoder optionally using the parallel processing described. First and second stream(s) may be transmitted over one network or channel with greater protection or robustness applied to the first stream, e.g. the first stream may be sent via RTF (or UDP) and the second stream via TCP. Alternatively or in addition, first and second streams may be transmitted via distinct networks or channels, the first network or channel having a greater robustness (e.g. error protection), reliability or service guarantee than the second, in some embodiments, in this way, best effort decoding may be applied to the second stream, and transmission of at least some representation of the video may be guaranteed by the first stream, or if for some reason the first stream is not received, video from a an independently decodable portion of the second stream may be decoded an used. Greater robustness or protection may be provided for example in physical layer transmission algorithms and/or by applying different levels of Forward Error Correction.

Figure 19:
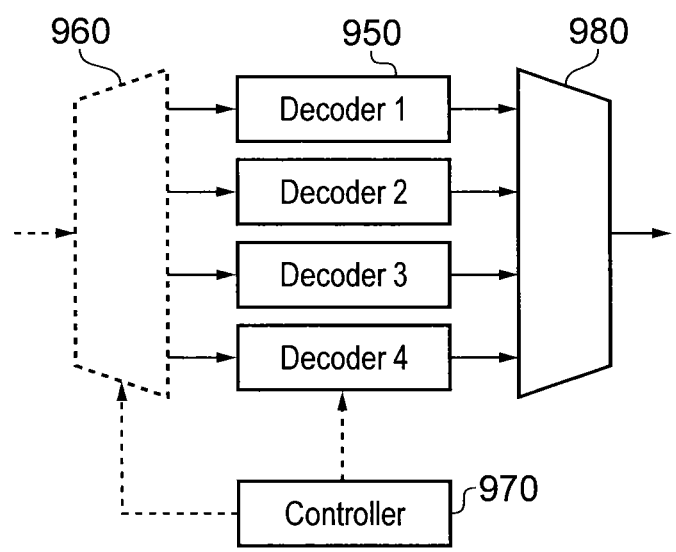
FIG. 19 schematically illustrates a decoder arrangement using plural decoders.

Referring to FIG. 19, four (or another number appropriate to the portioning in use) of separate decoders 950 are provided with respective input encoded data, for example via a demultiplexer 980 operating under the control of a controller 970. The decoders 950 decode their respective input encoded data into output decoded data which is recombined into an output image by a multiplexer 980, providing an example of a combiner configured to combine the decoded portions to generate a representation of that video image.

Various ways of operating the apparatus of FIG. 19 will now be discussed. In particular, the following processes will be discussed: a full decoding process; a partial decoding process; and a "best efforts" decoding process, it is noted that the full decoding process and the partial decoding process are discussed primarily for the purposes of comparison with the best efforts decoding process. It is also noted that the term "best efforts" is simply a convenient name for the way in which data is handled in the process and does not necessarily imply that the processing is better (except in ways which will be described below) than other types of processing. In the various processes, the controller 970 is responsible for routing data for decoding to the decoders 950. Note that a different number of the decoders 950 could be used, or even (in an example) one decoder having time-divided processing resource could be used in place of the plurality of decoders.

FIG. 19 therefore provides an example of a video data decoding apparatus configured to decode input encoded data representing a plurality of independently decodable portions of a video image, each portion representing a spatially subsampled version of the video image so that a combination of the plurality of portions provides a representation of ail of the pixels of that video image, each pixel being represented by only a respective one of the portions, and at least one portion providing a subsampled representation of the entire video image, the video data decoding apparatus comprising: one or more decoders having a collective processing capacity which is lower than the maximum possible processing requirements for decoding the plurality of portions; and a controller configured to route data of the portions to the one or more decoders so that, in the event that the processing requirements for the plurality of portions in respect of a video image exceeds the collective processing capacity of the one or more decoders, the one or more decoders cooperate to decode the whole of at least one of the portions for that video image.

Figure 20:
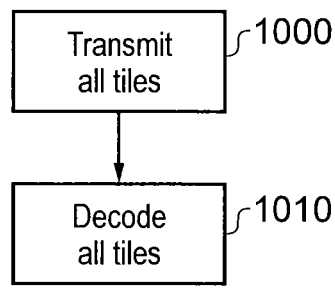
FIG. 20 is a schematic flowchart illustrating steps in a full decoding process.

FIG. 20 is a schematic flowchart illustrating steps in a full decoding process. At step 1000, all of the files (that is to say, four tiles in the present example) are transmitted by the encoder to the decoder, and at a step 1010 all of the tiles are decoded so as to recreate the original (full resolution) image. Example uses of the full decoding process simply to provide parallel decoding operations.

Figure 21:
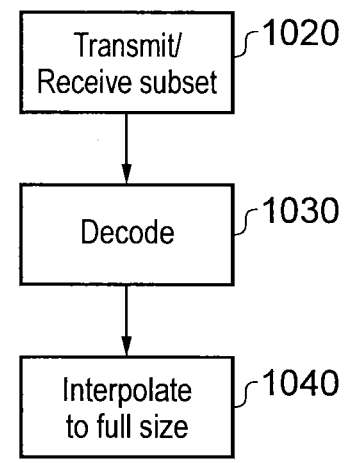
FIG. 21 is a schematic flowchart illustrating steps in a partial decoding process.

FIG. 21 is a schematic flowchart illustrating steps in a partial decoding process. Here, at step 1020, either a subset of the tiles is sent from the encoder to the decoder, or alternatively all of the tiles are transmitted but only a subset of the files is received or accessed by the decoder, in either situation, and firstly considering a spatial partitioning arrangement, not all of the files relating to a single image are available to the decoder. At a step 1030, the decoder decodes those tiles which it has access to, and generates a subsampled output image. If the decoder has access to just one file (in the present example using four files) the decoder produces, at the step 1030, a quarter-resolution output image. One option is simply to output this at quarter-size. Another option, which is also applicable to the situation where the decoder has access to more than one tile, is to interpolate the subsampled output image to the full (original) image size at a step 1040. Example uses of the partial decoding process are to provide a preview of video data over a network by using a reduced data bandwidth and a simpler decoder, in preview situations (or other situations such as those discussed above) where the full resolution is not currently required.

A preview situation could be used in video editing or video streaming when using a technique known as scrubbing to view a keyframe that occurs at a point selected by a user on a timeline representing the duration of a video clip. Such keyframes could be called on request from a server or otherwise derived from the video stream and decoded rapidly if they have not already been received.

In the description above of the step 1020, a subset of tiles was referred to, and an example was given relating to a special partitioning arrangement. Alternatively, or in addition, this technique can apply to a temporal partitioning arrangement such that the "subset" can relate to a temporal subset as well as or instead of a spatial subset. In this context, a temporal subset implies that files from some but not all images of the video signal are handled by the decoder at the step 1030. So, the decoder could handle all of the tiles from an image, but no tiles from another image, or alternatively the decoder could handle some files from an image and a different selection of tiles from another image, or alternatively the decoder could handle some tiles from an image and no tiles from another image. All of these are encompassed within the concept of a "subset" discussed in connection with the step 1020.

Figure 22:
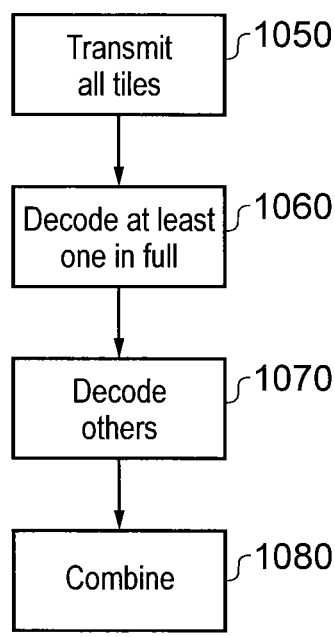
FIG. 22 is a schematic flowchart illustrating steps in a so-called best efforts decoding process.

FIG. 22 is a schematic flowchart illustrating steps in a so-called best efforts decoding process. In a best efforts decoding the arrangement, all of the portion data is transmitted to the decoder, and the decoder operates in parallel to attempt to decode each of the portions or tiles. However, it is noted that the amount of data which needs to be handled (and therefore the amount of decoding processing) can vary according to factors such as the particular image content. One way to deal with this variation is to provide a set of parallel decoders such that each decoder can individually cope with the maximum possible amount of decoding processing which could (in the worst possible case) be required for a single tile. But in the average situation, in which the amount of decoding processing required for a tile is less than the worst possible case, this arrangement would lead to a waste of processing resources because the decoder would be over-equipped to handle the average situation. The "best efforts" arrangement addresses this potential waste of resources by providing a parallel decoder which comprises respective tile decoders having a capacity appropriate for the amount of decoding processing required for an average or typical tile rather than the amount of decoding processing required for the worst case situation. In normal operation, many of the tiles may be completely decoded by such an arrangement. However, because of the normal statistical variation amongst tiles, there may be some tiles which require more decoding processing than an individual tile decoder is capable of providing within an image period. As part of the "best efforts" decoding arrangement, tile data may be redistributed between the multiple parallel decoders in order to ensure in such a situation that at least one tile is fully decoded if this other tiles of the same image are only partially decoded.

So, in the "best effort" decoding, at least one tile is decoded in full. As discussed above, the special demultiplexing process used in the generation of the tiles means that decoding one tile provides at least a subsampled impression or version of the entire image. Remaining processing capacity in respect of that image period is used to decode, at least in part, one or more other tiles. The output is a mix, interpolation or other combination (by the combiner, mentioned above) of whatever decoded data is available in respect of each of the tiles.

Referring to FIG. 22, at a step 1050 all of the tile data is provided from the encoder to the parallel decoder. At a step 1060, the decoder decodes at least one of the files in full. At a step 1070, the decoder uses the remaining processing capacity of the decoder in respect of that image period to decode at least some parts of at least some other tiles (whether from the same picture or another picture in the stream), such that if necessary the decoding of one or more of the other tiles is truncated when the processing capacity available in respect of that image period has been used up. This provides an example of the controller 970 routing data of the portions to the one or more (for example, a plurality of) parallel decoders so that, in the event that the processing requirements for the plurality of portions in respect of a video image exceeds the collective processing capacity of the plurality of decoders, the one or more (for example, a plurality of) parallel decoders cooperate to decode the whole of at least one of the portions for that video image. Then, at a step 1080, the one fully decoded tile is combined with whatever data has been recovered by at least a truncated decoding of the other tiles to generate an output image. The step 1080 includes an interpolation process to the extent needed to provide output samples not present in the decoded portion(s), the interpolation process using data which is present in the decoded portion(s).

FIG. 22 therefore provides an example of a video data decoding method for decoding input encoded data representing a plurality of independently decodable portions of a video image, each portion representing a spatially subsampled version of the video image so that a combination of the plurality of portions provides a representation of all of the pixels of that video image, each pixel being represented by only a respective one of the portions, and at least one portion providing a subsampled representation of the entire video image, the method comprising: routing data of the portions to one or more decoders having a collective processing capacity which is lower than the maximum possible processing requirements for decoding the plurality of portions so that, in the event that processing requirements for the plurality of portions in respect of a video image exceeds the collective processing capacity of the one or more decoders, the one or more decoders cooperate to decode the whole of at least one of the portions for that video image; and combining the decoded portions to generate a representation of that video image.

FIGS. 23 to 28 provide schematic examples of a best efforts decoding process.

First, consider a parallel decoding arrangement comprising four decoders. If each decoder has the capacity to decode an "average" tile, and the input encoded images are arranged as sets of four tiles, then in the average case, an entire image will be successfully decoded. In the schematic representation of FIG. 23 and FIG. 24, the amount of decoding processing available for such an average situation is indicated by a succession of three shaded boxes (time is represented from left to right) so that each decoder provides three arbitrary units of decoding processing in respect of each image period. The shading changes to another type of shading to indicate a next image period. Accordingly, in the average case, a file can be fully decoded in the three "units" of decoding processing such that a next tile can be decoded in the subsequent three "units" of decoding processing.

However, consider a situation in which, due to statistical variations and factors such as image content, the tiles of a particular image require (say) five "units" of decoding processing each.

FIGS. 23 to 28 provide examples of the use of the decoder as discussed above (where in these examples the one or more decoders comprise a plurality of parallel decoders, though one decoder could instead be used) in which the controller is configured to detect, in respect of a selected portion, that the processing requirements for the selected portion in respect of a video image exceeds the processing capacity of a single one of the plurality of decoders, and in response to such a detection, to route data of the selected portion to another one of the decoders and/or to decode the selected portion over a period corresponding to more than one image period. The controller may be configured to apply a priority order to the decoding of the portions so that, in the event that the controller detects that the processing requirements for the plurality of portions exceeds the collective processing capacity of the plurality of decoders, the controller controls the plurality of decoders to fully decode at least a highest priority portion in the priority order. The controller may be configured to vary the priority order between images of the video signal. Note that it may or may not be possible to predict in advance of decoding (or during decoding) which portion(s) will be successfully decoded, but in either case the detection represents an example of detecting that the processing requirements for the plurality of portions exceeds the collective processing capacity of the plurality of decoders. At the end of the available or allotted decoding period or set of processing resources, a partially decoded portion is either truncated, discarded or continued into another period, depending on the arrangement and priority system in use.

Figures 23, 24, 25:
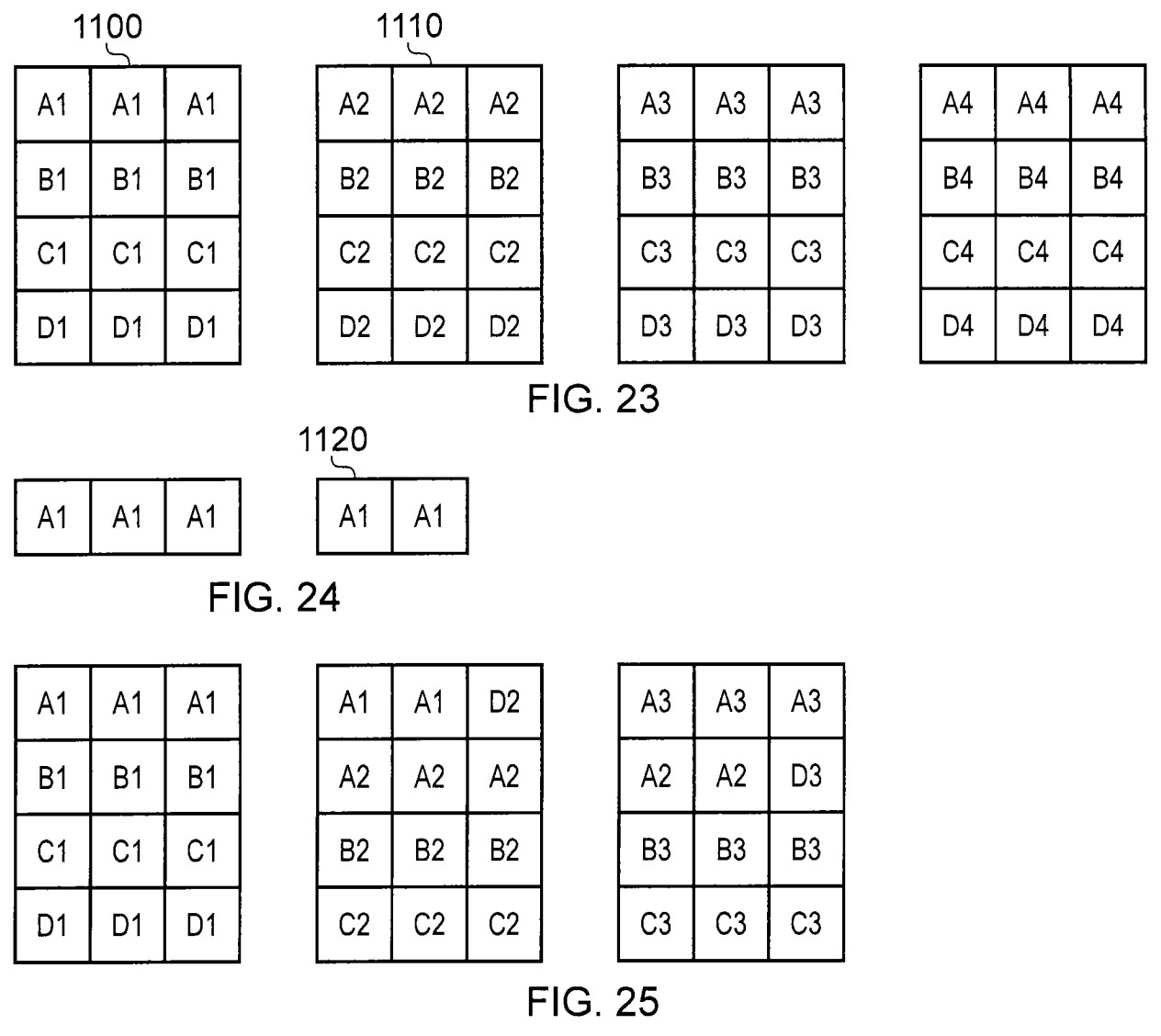

FIG. 23 schematically illustrates the first part of a decoding process for a first frame. The frame is formed of four portions as discussed above, and which are labelled in FIG. 23 as "A", "B", "C" and "D", with numerical indicators so that, for example, a portion "A1" corresponds to data from a first frame, "A2" to data from a second frame and so on. Note that the portion labelled as "A" may in some examples contain image content according to a rotating or time-varying pattern such as that illustrated in FIG. 16.

In the average case, each portion in each frame requires three "units" of decoding processing in order to be fully decoded. Here, the term "unit" does not necessarily correspond to any particular physical or programming feature of the decoder, except that it allows a comparison between different amounts of decoding processing required for different portions. In some examples, however, the units can be considered as time slots within a frame period.

The decoding processing can be considered as successive frame periods 1100, 1110 and so on, with each frame period providing the three "units" of decoding processing corresponding to each of the four decoders of FIG. 19.

As mentioned, in an average case, each portion requires three units of decoding processing per frame. This average case is illustrated schematically in FIG. 23, in that in the first frame period 1100, a first decoder is able to fully decode the portion A formed of A1 . . . A3, a second decoder is able to fully decode the portion B formed of B1 . . . B3 and so on. Similarly, in the second frame period 1110, each of the portions can be fully decoded.

Consider now an example in which five units of processing are required for the portion "A1" but only three such units are available from each decoder in respect of each image period. Accordingly, as shown by the schematic line of FIG. 24 corresponding to a first decoder (decoder 1), by the time the next processing (frame) period for 1120 starts, only three of the five "A1" units have been decoded. At this stage, the next "A" portion, the portion "A2" becomes available for decoding.

Various techniques will be discussed for dealing with this situation.

In an example illustrated schematically in FIG. 25 (in which each "A" portion requires five units of decoding and the B, C and D portions each require three units) the decoders, under the control of the controller 970, are arranged to decode ail of the portion A1, even if the decoding processing extends into a next frame period. At the start of the next frame period, when the portion A2 becomes available, the whole of the portion A2 is decoded even if the decoding extends into a following frame period, in the third frame period shown in FIG. 25, processing of the portion A2 continues, and processing of the portion A3, which has now become available, starts (and extends into a further frame period, not shown). To provide the processing capacity to handle this extra work in respect of the portions A, processing of other portions is displaced, which is to say it is either not attempted or is only partially completed. In the example of FIG. 25, the portion A takes priority over the portion B, which takes priority over the portion C, which takes priority over the portion D. So, in the second of the frame periods illustrated in FIG. 25, where the processing of the portion A1 continues at the same time as the processing of the portion A2 has started, the portion A2 displaces the portion B2, which in turn displaces the portion C2, which in turn displaces the portion D2. in fact, the portion D2 is only partially decoded using available capacity on the first decoder.

The precise technique to be used for allocating units of processing to each decoder can be varied, in an example, a so-called round robin algorithm is used so that, once priority has been given to a particular portion such as the portion A in the example shown, a next instance of that portion (for next image) is allocated to the next available decoder in preference to the portion which would normally have been routed to that decoder. In an example shown in FIG. 26, in a first frame period 1200 the portion priority is A, B, C, D; in a second frame period 1210 the portion priority is B, C, D, A; in a third frame period 1220 the portion priority is C, D, B, A and so on in a rotating pattern. Assume for the sake of the example shown in FIG. 26 that both of the portions A and B require five units of processing thoughtful decoding. In the first frame period 1200, the portion A1 has not been fully decoded but decoding continues into the second frame period 1210. The portion B1 is also not fully decoded but decoding is terminated early (as indicated by an asterisk) at the end of the first frame period 1200. In the second frame period 1210, the portion B2 is fully decoded (with decoding extending into the third frame period 1220) but the portion A2 is not fully decoded, and so on.

In other examples, it may be that a particular portion requires more than the average three units of decoding processing whereas another portion requires fewer, in such an instance, and assuming the data for decoding is available at the appropriate time, processing of a portion (such as the portion A2 in FIG. 27) can start early, making use of processing capacity not required for processing of a portion (such as the portion C1 in FIG. 27) which requires fewer than the average number of units of decoding processing. Note that in a simple spatial subsampling system of the type described above, in the absence of any other measures, the image content and processing requirements of each portion are likely to be similar. However, in other arrangements, one portion (or a subset of portions) could be given priority, for example in terms of a guaranteed available data rate and/or transmission over a higher priority data transmission channel, with other portions being sent over a lower priority data transmission channel, in such an example, the portion(s) sent over the higher priority channel are more likely (or maybe guaranteed) to arrive at a decoder in time for full decoding, whereas the other portions sent over a lower priority channel may or may not arrive in time for full or even partial decoding, in this example of a best efforts decoding arrangement, the issue is not necessarily one of allocating processing resources at the decoder (though this may apply as well), but rather one of which portions are actually available for decoding at the appropriate time. An example of the use of plural data transmission channels having different data transmission priorities might occur in the context of newsgathering, for example in the context of a wireless newsgathering camera in which one or more portions may be sent by a high priority (but potentially more expensive and/or of insufficient capacity to carry a whole video stream) channel such as a point to point link, whereas other portions might be sent by a lower priority channel such as a data stream using an internet data link.

In a further example illustrated schematically in FIG. 28, even though one or more portions requires more than the average three units of processing available per frame period, each portion is fully decoded but in order to manage this, some frames are completely skipped (not decoded at all in respect of any portion). In FIG. 28, the third frame represented by portions A3 . . . D3 is not decoded at all.

In the discussion above, the portions have been labelled as A . . . D rather than EE, OE and so on. This is because the technique is applicable to both spatial partitioning and temporal partitioning. In a spatial partitioning arrangement, there might be a fixed relationship defining which portion is given priority, so that (for example) the portion A might always be the EE portion. In a temporal partitioning system, the order of the portions can vary from image to image so that, for example, the portion A in the above discussion might be the portion illustrated at the top left quadrant of each of FIGS. 17a-17d, so that in other words the portion given priority can vary from image to image.

As mentioned above, a similar outcome can be achieved in which fewer decoders than portions are provided, for example even one decoder, in which the processing requirements of the portions are time-divided or otherwise divided for execution by the decoder.

So-called best efforts decoding can also apply to a situation of non-receipt of some but not all portions, for example in a situation where the controller is configured to route data of the portions to the one or more decoders so that, in the event that some but not all of the portions are received by the decoder in respect of a particular video image, the one or more decoders cooperate to decode the whole of at least one of the portions for that video image.

So-called best efforts decoding can also apply to decoding some or all portions of a subset of images of a video signal, so that the controller is configured to route data of the portions to the one or more decoders so as to decode portions of some, but not others, of a succession of video images.

Data Signals

If will be appreciated that data signals generated by the variants of coding apparatus discussed above, and storage or transmission media carrying such signals, are considered to represent embodiments of the present disclosure.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be apparent that numerous modifications and variations of the present disclosure are possible in light of the above teachings. It is therefore to be understood that within the scope of the appended claims, the technology may be practiced otherwise than as specifically described herein.

For example, although the discussion above relates to one image decoder (with four portion decoders), this system could be extended for example so that two (or more) image decoders (for example, previewing two or more video streams in a non-linear editor) can share resources between eight portion decoders, and so on.

The invention claimed is:

1. A video data decoding apparatus, comprising:
  a plurality of decoders configured to decode input encoded data representing a plurality of portions of a video image, wherein
    each portion of the plurality of portions is independently decodable and represents a spatially subsampled version of the video image so that a combination of the plurality of portions represents all pixels of the video image,
    each pixel of the pixels of the video image is represented by only a respective portion of the plurality of portions,
    a first portion of the plurality of portions provides a subsampled representation of the entire video image, and
    the plurality of decoders has a collective processing capacity which is lower than maximum possible processing requirements to decode the plurality of portions;
  a controller configured to route data of the plurality of portions to the plurality of decoders so that,
    when processing requirements to decode the plurality of portions for the video image exceed the collective processing capacity of the plurality of decoders, the plurality of decoders cooperate to decode the whole of the first portion, and when the processing requirements to decode the plurality of portions for the video image do not exceed the collective processing capacity of the plurality of decoders, the plurality of decoders cooperate to decode the plurality of portions; and a combiner circuit configured to combine portions decoded by the plurality of decoders to generate a representation of the video image.

2. The video data decoding apparatus according to claim 1, wherein each spatially subsampled version comprises every $n^{th}$ pixel of an image in a horizontal image direction and every $m^{th}$ pixel of that image in a vertical image direction.

3. The video data decoding apparatus according to claim 2, wherein a number of portions in the plurality of portions is equal to m×n.

4. The video data decoding apparatus according to claim 1, wherein the plurality of portions in respect of the video image are encoded as respective independently decidable regions of a composite image formed by juxtaposition of the portions.

5. The video data decoding apparatus according to claim 4, wherein the plurality of portions are arranged in the composite image according to a portion pattern.

6. The video data decoding apparatus according to claim 5, wherein the portion pattern varies between images of a video signal.

7. The video data decoding apparatus according to claim 6, wherein the portion pattern varies between successive images.

8. The video data decoding apparatus according to claim 5, wherein the portion pattern is such that a pixel order is reversed in at least one portion of the plurality of portions.

9. The video data decoding apparatus according to claim 1, wherein the plurality of decoders comprise a plurality of parallel decoders, and the controller is configured to detect, in respect of a selected portion, whether the processing requirements for the selected portion exceed a processing capacity of a single decoder of the plurality of decoders, and when the processing requirements for the selected portion exceed the processing capacity of the single decoder, route data of the selected portion to another decoder of the plurality of decoders or decode the selected portion over a period corresponding to more than one image period.

10. The video data decoding apparatus according to claim 9, wherein the controller is configured to apply a priority order to the decoding of the portions so that, when the controller detects that the processing requirements for the plurality of portions exceed the collective processing capacity of the plurality of decoders, the controller controls the plurality of decoders to fully decode at least a highest priority portion in the priority order.

11. The video data decoding apparatus according to claim 10, wherein the controller is configured to vary the priority order between images of the video signal.

12. A video data encoding apparatus configured to encode input video data representing successive images of a video signal, the encoding apparatus comprising:

a data partitioning unit configured to partition an image of the video signal into a plurality of portions, wherein each portion of the plurality of portions being independently decodable and represents a spatially subsampled version of the video image so that a combination of the plurality of portions represents all pixels of the video image, each pixel of the pixels of the video image is represented by only a respective portion of the plurality of portions, a first portion of the plurality of portions provides a subsampled representation of the entire video image, the data partitioning unit partitions the image so as to associate indicator data with the plurality of portions, the indicator data indicating the partitioning to a plurality of decoders the plurality of decoders having a collective processing capacity lower than maximum possible processing requirements to decode the plurality of portions, when processing requirements to decode the plurality of portions for the video image exceed the collective processing capacity of the plurality of decoders, the plurality of decoders cooperate to decode the whole of the first portion, and when the processing requirements to decode the plurality of portions for the video image do not exceed the collective processing capacity of the plurality of decoders, the plurality of decoders cooperate to decode the plurality of portions.

13. The video data encoding apparatus according to claim 12, wherein the plurality of portions in respect of the video image are encoded as respective independently decodable regions of a composite image formed by juxtaposition of the portions.

14. The video data encoding apparatus according to claim 13, wherein the plurality of portions are arranged in the composite image according to a portion pattern.

15. The video data encoding apparatus according to claim 14, wherein the portion pattern varies between images of the video signal.

16. The video data encoding apparatus according to claim 12, wherein the indicator data is associated with the encoded video data as a supplemental enhancement information message.

17. A video storage, retrieval, transmission, reception or display apparatus comprising apparatus according to claim 1.

18. A video data decoding method for controlling a plurality of decoders to decode input encoded data representing a plurality of portions of a video image, each portion of the plurality of portions is independently decodable and represents a spatially subsampled version of the video image so that a combination of the plurality of portions represents all pixels of the video image, each pixel of the pixels of the video image is represented by only a respective portion of the plurality of portions, a first portion of the plurality of portions provides a subsampled representation of the entire video image, and the plurality of decoders has a collective processing capacity which is lower than maximum possible processing requirements to decode the plurality of portions, the method comprising:

routing data of the portions to the plurality of decoders;

controlling, when processing requirements to decode the plurality of portions for the video image exceed the collective processing capacity of the plurality of decoders, the plurality of decoders to cooperate to decode the whole of the first portion;

controlling, when the processing requirements to decode the plurality of portions for the video image do not exceed the collective processing capacity of the plurality of decoders, the plurality of decoders to cooperate to decode the plurality of portions; and combining portions decoded by the plurality of decoders to generate a representation of the video image.

19. A video data encoding method for encoding input video data representing successive images of a video signal, the encoding method comprising:

partitioning an image of the video signal into a plurality of portions,
- each portion of the plurality of portions being independently decodable and represents a spatially subsampled version of the video image so that a combination of the plurality of portions represents all pixels of the video image,
- each pixel of the pixels of the video image is represented by only a respective portion of the plurality of portions, and
- a first portion of the plurality of portions provides a subsampled representation of the entire video image; and associating indicator data with the plurality of portions to indicate the partitioning to a plurality of decoders, wherein the plurality of decoders having a collective processing capacity lower than maximum possible processing requirements to decode the plurality of portions, when processing requirements to decode the plurality of portions for the video image exceed the collective processing capacity of the plurality of decoders, the plurality of decoders cooperate to decode the whole of the first portion, and when the processing requirements to decode the plurality of portions for the video image do not exceed the collective processing capacity of the plurality of decoders, the plurality of decoders cooperate to decode the plurality of portions.

20. A non-transitory computer readable medium including computer program instructions, which when executed by a computer causes the computer to perform the method of claim 18.

* * * * *